United States Patent
Aila et al.

(10) Patent No.: US 9,817,919 B2
(45) Date of Patent: Nov. 14, 2017

(54) AGGLOMERATIVE TREELET RESTRUCTURING FOR BOUNDING VOLUME HIERARCHIES

(71) Applicant: NVIDIA Corporation, Santa Clara, CA (US)

(72) Inventors: Timo Oskari Aila, Tuusula (FI); Tero Tapani Karras, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 824 days.

(21) Appl. No.: 14/065,321

(22) Filed: Oct. 28, 2013

(65) Prior Publication Data

US 2014/0365529 A1    Dec. 11, 2014

Related U.S. Application Data

(60) Provisional application No. 61/833,412, filed on Jun. 10, 2013.

(51) Int. Cl.
*G06F 17/30*    (2006.01)

(52) U.S. Cl.
CPC .............. *G06F 17/30961* (2013.01)

(58) Field of Classification Search
CPC ....... G06T 15/06; G06T 15/005; G06T 17/20; G06T 17/005; G06T 19/00; G06T 19/20; G06T 2210/12; G06T 2210/56; G06T 15/10; G06T 2210/36; G06F 17/30327; G06F 17/30961; G06F 17/30241; G06F 17/50; G06F 17/30091; G06F 17/30221; G06F 17/30292

USPC .......................................................... 707/797
See application file for complete search history.

(56) References Cited

U.S. PATENT DOCUMENTS

| | | | |
|---|---|---|---|
| 8,253,730 B1 * | 8/2012 | Carr | G06T 15/06 345/419 |
| 9,013,484 B1 * | 4/2015 | Jakob | G06T 15/06 345/419 |
| 9,547,932 B2 | 1/2017 | Karras et al. | |
| 2002/0004710 A1 * | 1/2002 | Murao | G06T 17/005 702/167 |
| 2009/0030921 A1 | 1/2009 | Kadiyska et al. | |
| 2009/0167763 A1 * | 7/2009 | Waechter | G06T 15/06 345/426 |
| 2009/0213115 A1 * | 8/2009 | Keller | G06T 15/06 345/419 |
| 2013/0016109 A1 | 1/2013 | Garanzha | |
| 2013/0328876 A1 * | 12/2013 | Keely | G06T 15/06 345/426 |

(Continued)

OTHER PUBLICATIONS

Aila, T. et al., "Understanding the Efficiency of Ray Traversal on GPUs," Proc. High-Performance Graphics, Aug. 2009, pp. 1-5.

(Continued)

*Primary Examiner* — Evan Aspinwall
(74) *Attorney, Agent, or Firm* — Zilka-Kotab, PC

(57) ABSTRACT

A system, method, and computer program product are provided for modifying a hierarchical tree data structure. An initial hierarchical tree data structure is received, and treelets of node neighborhoods are formed. A processor restructures the treelets using agglomerative clustering to produce an optimized hierarchical tree data structure that includes at least one restructured treelet, where each restructured treelet includes at least one internal node.

14 Claims, 17 Drawing Sheets

(56) References Cited

U.S. PATENT DOCUMENTS

| | | | |
|---|---|---|---|
| 2014/0340412 A1* | 11/2014 | Doyle | G06T 1/20 345/522 |
| 2014/0362074 A1 | 12/2014 | Karras et al. | |
| 2014/0365529 A1 | 12/2014 | Aila et al. | |
| 2014/0365532 A1 | 12/2014 | Karras et al. | |

OTHER PUBLICATIONS

Aila, T. et al., "Understanding the Efficiency of Ray Traversal on GPUs—Kepler and Fermi Addendum," NVIDIA Technical Report NVR-2012-02, pp. 1-4.
Dammertz, H. et al., "The Edge Volume Heuristic-Robust Triangle Subdivision for Improved BVH Performance," To appear in an IEEE VGTC sponsored conference proceedings, Aug. 2008, pp. 1-4.
Garanzha, K. et al., "Simpler and Faster HLBVH with Work Queues," in High Performance Graphics 2011, Aug. 2011, pp. 1-6.
Garanzha, K. et al., "Grid-based SAH BVH construction on a GPU," The Visual Computer, Jun. 2011, vol. 27, Issue 6-8, pp. 697-706.
Goldsmith, J. et al., "Automatic Creation of Object Hierarchies for Ray Tracing," IEEE Computer Graphics and Applications, May 1987, vol. 7 Issue 5, pp. 14-20.
Karras, T., "Maximizing Parallelism in the Construction of BVHs, Octrees, and k-d Trees," Eurographics conference on High-Performance Graphics, 2012, pp. 33-37.
Kensler, A., "Tree Rotations for Improving Bounding Volume Hierarchies," To appear in the Proceedings of the IEEE 2008 Symposium on Interactive Ray Tracing, Aug. 2008, pp. 1-4.
Kopta, D. et al., "Fast, Effective BVH Updates for Animated Scenes," Proceedings of the ACM SIGGRAPH Symposium on Interactive 3D Graphics and Games, 2012.
Lauterbach, C. et al., "Fast BVH Construction on GPUs," Eurographics 2009, 2009, vol. 28, No. 2, pp. 1-10.
MacDonald, J. D. et al., "Heuristics for ray tracing using space subdivision," The Visual Computer, 1990, vol. 6, Issue 3, pp. 153-166.
Pantaleoni, J. et al.,"HLBVH: Hierarchical LBVH Construction for Real-Time Ray Tracing of Dynamic Geometry," High Performance Graphics, 2010, pp. 1-9.
Popov, S. et al., "Object Partitioning Considered Harmful: Space Subdivision for BVHs," Proceedings of the Conference on High Performance Graphics, 2009, pp. 1-8.
Wald, I., "On Fast Construction of SAH-based Bounding Volume Hierarchies," IEEE Symposium on Interactive Ray Tracing, 2007, pp. 1-8.
Wald, I., "Fast Construction of SAH BVHs on the Intel Many Integrated Core (MIC) Architecture," Intel Corp Technical Report No. 2010-06-11-VAR001, pp. 1-10.
Walter, B. et al., "Fast Agglomerative Clustering for Rendering," In IEEE Symposium on Interactive Ray Tracing (RT), 2008, pp. 1-6.
Woop, S. et al., "A Ray Tracing Hardware Architecture for Dynamic Scenes," Thesis, Mar. 29, 2004, pp. 1-87.
Gu, Y. et al., "Efficient BVH Construction via Approximate Agglomerative Clustering," Proceedings of the 5th High-Performance Graphics Conference, Jul. 2013, pp. 1-8.
Ernst, M. et al., "Early Split Clipping for Bounding Volume Hierarchies," Proceedings of the IEEE Symposium on Interactive Ray Tracing, 2007, pp. 1-6.
Bittner, J. et al., "Fast Insertion-Based Optimization of Bounding Volume Hierarchies," Computer Graphics Forum, 2013, vol. 32 , No. 1, pp. 85-100.
Stich, M. et al., "Spatial Splits in Bounding Volume Hierarchies," In the Proceedings of High Performance Graphics, 2009, pp. 1-7.
Karras et al., U.S. Appl. No. 13/970,547, filed Aug. 19, 2013.
Karras et al., U.S. Appl. No. 14/035,899, filed Sep. 24, 2013.
Non-Final Office Action from U.S. Appl. No. 13/970,547, dated May 20, 2016.
Non-Final Office Action from U.S. Appl. No. 14/035,899, dated Apr. 19, 2016.
Non-Final Office Action from U.S. Appl. No. 14/035,899, dated Sep. 25, 2015.
Final Office Action from U.S. Appl. No. 14/035,899, dated Nov. 12, 2015.
Stich, M. et al., "Spatial Splits in Bounding Volume Hierarchies," HPG 2009, Aug. 1-3, 2009, pp. 7-13.
Notice of Allowance from U.S. Appl. No. 14/035,899, dated Aug. 31, 2016.
Final Office Action from U.S. Appl. No. 13/970,547, dated Nov. 30, 2016.
Non-Final Office Action from U.S. Appl. No. 13/970,547, dated Apr. 20, 2017.

* cited by examiner

1: function ConstructOptimalTree($S$)
2:   // Single leaf?
3:   if $|S| = 1$ then
4:     $l \leftarrow S_0$
5:     return $(l, C(l))$
6:   end if
7:   // Try each way of partitioning the leaves
8:   $(T_{opt}, c_{opt}) \leftarrow (0, \infty)$
9:   for each $P \subseteq S$ do
10:     if $P \mathrel{!=} 0$ and $P \mathrel{!=} S$ then
11:       // Optimize each resulting subtree recursively
12:       $(T_l, c_l) \leftarrow$ ConstructOptimalTree($P$)
13:       $(T_r, c_r) \leftarrow$ ConstructOptimalTree($S \setminus P$)
14:       // Calculate SAH cost (first case of Equation 2)
15:       $a \leftarrow$ Area(UnionOfAABBs($S$))
16:       $c \leftarrow C_i \cdot a + c_l + c_r$
17:       // Best so far?
18:       if $c < c_{opt}$ then
19:         $T_{opt} \leftarrow$ CreateInternalNode($T_l, T_r$)
20:         $c_{opt} \leftarrow c$
21:       end if
22:     end if
23:   end for
24:   // Collapse subtree? (second case of Equation 2)
25:   $a \leftarrow$ Area(UnionOfAABBs($S$))
26:   $t \leftarrow$ TotalNumTriangles($S$)
27:   $c_{opt} \leftarrow \min\ (c_{opt}, (C_t \cdot a \cdot t))$
28:   return $(T_{opt}, c_{opt})$
29: end function

```
1:  // Calculate surface area for each subset
2:  for $\bar{s}$ = 1 to $2^n - 1$ do
3:      $a[\bar{s}] \leftarrow$ Area(UnionOfAABBs($L, s$))
4:  end for
5:  // Initialize costs of individual leaf nodes
6:  for $i = 0$ to $n - 1$ do
7:      $c_{opt}[2^i] \leftarrow C(L_i)$
8:  end for
9:  // Optimize every subset of leaf nodes
10: for $k = 2$ to $n$ do
11:     for each $\bar{s} \in [1, 2^{(n-1)}]$ with $k$ set bits do
12:         // Try each way of partitioning the leaf nodes
13:         $(c_{\bar{s}}, \bar{p}_{\bar{s}}) \leftarrow (\infty, 0)$
14:         for each $\bar{p} \in$ {partitionings of $\bar{s}$} do
15:             $c \leftarrow c_{opt}[\bar{p}] + c_{opt}[\bar{s}$ XOR $\bar{p}]$  // $S \setminus P$
16:             if $c < c_{\bar{s}}$ then $(c_{\bar{s}}, \bar{p}_{\bar{s}}) \leftarrow (c, \bar{p})$
17:         end for
18:         // Calculate final SAH cost (Equation 2)
19:         $t \leftarrow$ TotalNumTriangles($L, \bar{s}$)
20:         $c_{opt}[\bar{s}] \leftarrow \min ((C_i \cdot a[\bar{s}] + c_{\bar{s}}), (C_t \cdot a[\bar{s}] \cdot t))$
21:         $\bar{p}_{opt}[\bar{s}] \leftarrow \bar{p}_{\bar{s}}$
22:     end for
23: end for
```

1: $\bar{\delta} \leftarrow (\bar{s} - 1)$ AND $\bar{s}$
2: $\bar{p} \leftarrow (-\bar{\delta})$ AND $\bar{s}$
3: repeat
4: $\quad c \leftarrow c_{opt}[\bar{p}] + c_{opt}[\bar{s} \text{ XOR } \bar{p}]$
5: $\quad$ if $c < c_{\bar{s}}$ then $(c_{\bar{s}}, \bar{p}_{\bar{s}}) \leftarrow (c, \bar{p})$
6: $\quad \bar{p} \leftarrow (\bar{p} - \bar{\delta})$ AND $\bar{s}$
7: until $\bar{p} = 0$

1. N ← {set of treelet leaves}
2. while |N| > 1 do
3.    for each n ∈ N do
4.       $(p_n, c_n) \leftarrow (\emptyset, \infty)$
5.       for each p ∈ N do
6.          if p ≠ n and MERGECOST(n, p) < $c_n$ then
7.            $(p_n, c_n) \leftarrow (p, \text{MERGECOST}(n, p))$
8.          end if
9.       end for
10.       P[n] ← $p_n$
11.    end for
12.    for each n ∈ N do
13.       if P[P[n]] = n then
14.          N ← N \ {n, P[n]}
15.          r ← CREATEINTERNALNODE(n, P[n])
16.          N ← N + r
17.       end if
18.    end for
19. end while

*Fig. 5C*

AGGLOMERATIVE TREELET RESTRUCTURING FOR BOUNDING VOLUME HIERARCHIES

CLAIM OF PRIORITY

This application claims the benefit of U.S. Provisional Application No. 61/833,412, filed Jun. 10, 2013, the entire contents of which is incorporated herein by reference.

FIELD OF THE INVENTION

The present invention relates to graphics processing, and more particularly to restructuring a hierarchical tree data structure.

BACKGROUND

High-quality bounding volume hierarchies (BVHs) are essential for efficient ray tracing on a graphics processing unit (GPU). Conventional techniques for constructing BVHs can be divided into two categories:
1. Central processing unit (CPU)-based techniques that produce high-quality BVHs that are capable of supporting fast ray casts, but take a very long time to construct a BVH. The CPU-based techniques work well in situations where the scene remains static; the BVH has to be constructed only once, and the construction can be done offline.
2. GPO-based techniques that construct a BVH quickly, but produce unacceptably low-quality BVHs. The GPU-based techniques work well with animated scenes, but only if the number of ray casts per frame is low enough for BVH quality to be of little importance.

One problem is that there are use cases, including product and architecture design as well as movie rendering, for which none of the existing techniques is a good fit; the CPU-based techniques are too slow for constructing a new BVH every frame, whereas the GPU-based techniques do not yield high enough BVH quality.

Thus, there is a need for addressing the issue of BVH generation and/or other issues associated with the prior art.

SUMMARY

A system, method, and computer program product are provided for modifying a hierarchical tree data structure. An initial hierarchical tree data structure is received, and treelets of node neighborhoods are formed. A processor restructures the treelets using agglomerative clustering to produce an optimized hierarchical tree data structure that includes at least one restructured treelet, where each restructured treelet includes at least one internal node.

BRIEF DESCRIPTION OF THE DRAWINGS

FIG. 4A illustrates example code of a function for performing a step of FIG. 3, in accordance with one embodiment;

FIG. 4B illustrates example code for performing a step of FIG. 3, in accordance with one embodiment;

FIG. 4C illustrates example code for efficiently enumerating the partitionings, in accordance with one embodiment;

FIG. 5C illustrates example code for restructuring a treelet using agglomerative clustering, in accordance with one embodiment;

DETAILED DESCRIPTION

A low-quality hierarchical tree data structure may be constructed, and the node topology of the low-quality hierarchical tree data structure may be restructured, at least in part, in a parallel manner to produce a higher-quality hierarchical tree data structure. In one embodiment, the hierarchical tree data structure is a bounding volume hierarchy (BVH) that may be used to perform ray tracing. A restructured BVH is capable of performing ray casts significantly faster and may be produced at interactive rates. The interactive rates are needed to support application programs for product and architectural design and movie rendering that require high quality images at interactive rates.

In contrast, conventional techniques either generate low-quality BVHs at interactive rates or high-quality BVHs at non-interactive rates. The restructured BVH that is produced achieves 96% of the ray tracing performance compared to a very high-quality BVH constructed using a conventional CPU-based top-down construction method. However, the conventional CPU-based top-down construction technique cannot typically be performed at interactive rates. Techniques for constructing a low-quality BVH may be much faster compared with the conventional CPU-based top-down construction technique, but the low-quality BVH is typically only capable of producing 67% of the ray tracing performance compared to the conventional CPU-based top-down construction technique. In contrast, using the techniques described further herein, the time needed to construct the restructured BVH is only 2-3× compared to the fastest BVH construction techniques and the ray tracing performance of the restructured BVH is 96% of the highest-quality BVH.

Figure 1:
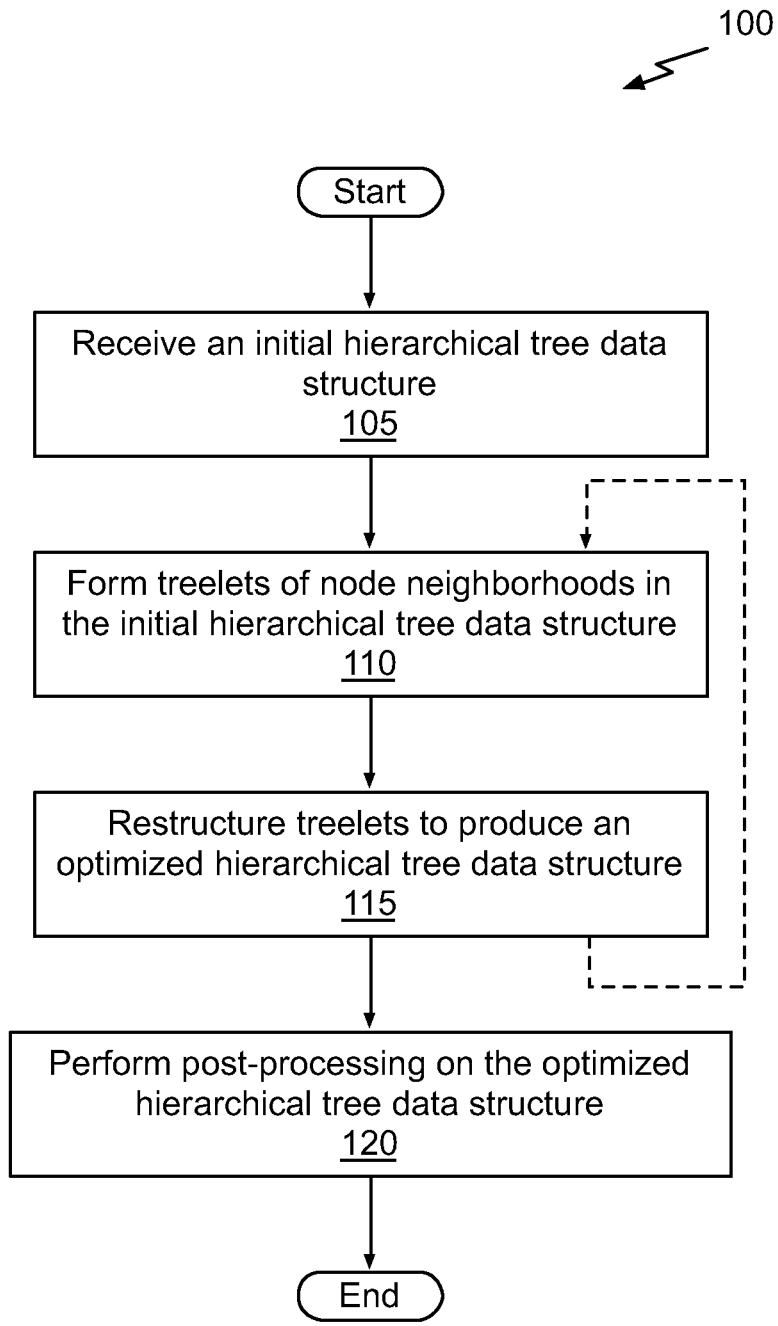
FIG. 1 illustrates a flowchart of a method for restructuring a hierarchical tree data structure, in accordance with one embodiment.

FIG. 1 illustrates a flowchart of a method 100 for generating a hierarchical tree data structure, in accordance with one embodiment. At step 105, an initial hierarchical tree data structure is received. In one embodiment, the hierarchical tree data structure may be a BVH. At step 110, treelets of node neighborhoods are formed in the hierarchical tree data structure. In the context of the following description, a treelet is a small, localized neighborhood of nodes (e.g., 5-10 nodes), where each node represents at least one element (i.e., at least one triangle or geometric primitive). The nodes in the treelet are a collection of immediate descendants of a given treelet root, consisting of n treelet leaf nodes and n−1 treelet internal nodes. A treelet leaf node can act as a representative of a subtree including two or more descendant nodes, or a treelet leaf node may be an actual leaf node that does not have any child nodes. In one embodiment, a parallel bottom-up traversal algorithm is used to form sets of non-overlapping treelets. The sets of non-overlapping treelets may be formed based on a Surface Area Heuristic (SAH) cost analysis.

At step 115, the treelets are restructured to produce an optimized hierarchical tree data structure. As a result, the topology of the hierarchical tree data structure is modified. In one embodiment, multiple treelets can be processed in parallel, and it is also possible to employ multiple threads to process a given treelet. At step 120, post-processing is performed on the optimized hierarchical tree data structure to collapse subtrees into leaf nodes to prepare the optimized hierarchical tree data structure for ray-tracing operations. In one embodiment, steps 110 and 115 may be repeated multiple times to produce the optimized hierarchical tree data structure.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Ray tracing performance is most commonly estimated using the SAH model, first introduced by Goldsmith and Salmon in 1.987 and later formalized by MacDonald and Booth in 1990. The classic approach for constructing BVHs is based on greedy top down partitioning of primitives that aims to minimize the SAH cost at every step. The SAH cost of a given acceleration structure is defined as the expected cost of tracing a non-terminating random ray through the scene:

$$C_i \sum_{n \in I} \frac{A(n)}{A(\text{root})} + C_l \sum_{l \in L} \frac{A(l)}{A(\text{root})} + C_t \sum_{l \in L} \frac{A(l)}{A(\text{root})} N(l) \quad (1)$$

where I and L in Equation 1 are the sets of internal nodes and leaf nodes, respectively, and $C_i$ and $C_l$ are their associated traversal costs. $C_t$ is the cost of a ray-primitive intersection test, and N(l) denotes the number of primitives referenced by leaf node. The surface area of the bounding volume of node n is indicated by A(n), and the ratio A(n)/A(root) corresponds to the conditional probability that a random ray intersecting the root is also going to intersect n. In the context of the following description, $C_i$=1.2, $C_l$=0, and $C_t$=1, which have been verified experimentally to give the highest correlation with the measured performance.

During construction of a BVH using the conventional technique by MacDonald and Booth 1990, the primitives at each node are classified to either side of an axis-aligned split plane according to the centroids of their axis-aligned bounding boxes (AABBs). The split plane is chosen by evaluating the SAH cost of the resulting child nodes for each potential plane, and selecting the one that results in the lowest cost. Leaf nodes are created when the SAH cost can no longer be improved through partitioning, the benefit of creating a new internal node is outweighed by its cost. As previously explained, the technique is slow and while a high-quality BVH may be constructed, the construction time is too long for interactive applications.

Local tree rotations (i.e., node swaps) are proposed by Kensler in 2008 to improve the SAH cost of an existing BVH. Kensler's technique modifies the set of children (i.e., child nodes) of at most two nodes of the tree for each tree rotation. Recently, an alternative algorithm based on iteratively removing nodes from the tree and inserting them back at optimal locations has been described by Bittner et al. in 2013. Since there are a large number of options for modifying the tree at each step, the algorithm is able to improve the quality significantly before getting stuck. However, since the technique is fundamentally serial, it is unclear whether the technique can be made to run at interactive rates. In the technique, a single removal-reinsertion operation may modify the set of children of at most three nodes of the tree.

A new approach for constructing high-quality BVHs as quickly as possible begins with an existing low-quality BVH and modifies the low-quality BVH to substantially equal the quality of a BVH constructed using conventional CPU-based top-down construction techniques. Instead of looking at individual nodes, neighborhoods of nodes referred to as treelets are formed and restructured. While the treelet constitutes a valid binary tree on its own, the treelet does not necessarily have to extend all the way down to the leaf nodes of the BVH. In other words, the children of every internal node of the treelet must be contained in the treelet, but a treelet leaf can act as a representative of an arbitrarily large subtree.

The restructuring technique repeatedly forms treelets for each root node and restructures the nodes within each treelet to minimize the overall SAH cost. The treelet leaf nodes and associated subtrees are kept intact during the restructuring, which means that the contents of the subtrees are not relevant as far as the optimization is concerned only properties of the treelet leaf nodes themselves (e.g., AABBs) are considered during the restructuring. Thus, the processing of each treelet is a perfectly localized operation, so that multiple treelets may be restructured in parallel.

Restructuring a given treelet can be viewed as discarding the existing internal nodes of the treelet and then constructing a new binary tree for the same set of treelet leaf nodes. A treelet internal node has two child nodes that may each be either a treelet internal node or a treelet leaf node. A treelet leaf node can represent a subtree including at least two child nodes, as described further herein, or a treelet leaf node may be an actual leaf node that does not have any child nodes. As the number of treelet leaf nodes remains unchanged, there will also be the same number of treelet internal nodes in the new treelet. The only thing that really changes, in addition the connectivity of the nodes, is the set of bounding volumes stored by the treelet internal nodes. In other words, restructuring provides a mechanism to reduce the surface area of the treelet internal nodes, which in turn translates directly to reducing the overall SAH cost of the BVH (equation I).

Finding the optimal node topology for a given treelet is believed to be a non-deterministic polynomial-time (NP)-hard problem, and the best known algorithms are exponential with respect to n. However, in practice, a high-quality BVH may be generated from a low-quality BVH using small size treelets. For example, n=7 provides $(2n-3)!!=10395$ (k!! denotes the double factorial, defined for odd k as $k*(k-2)*(k-4)* \ldots *3*1$) unique ways for restructuring each treelet, and there are also many ways of forming the treelets. A small size treelet of n≥5 provides enough freedom during restructuring to prevent the optimization of the BVH from getting stuck prematurely.

Figure 2A:
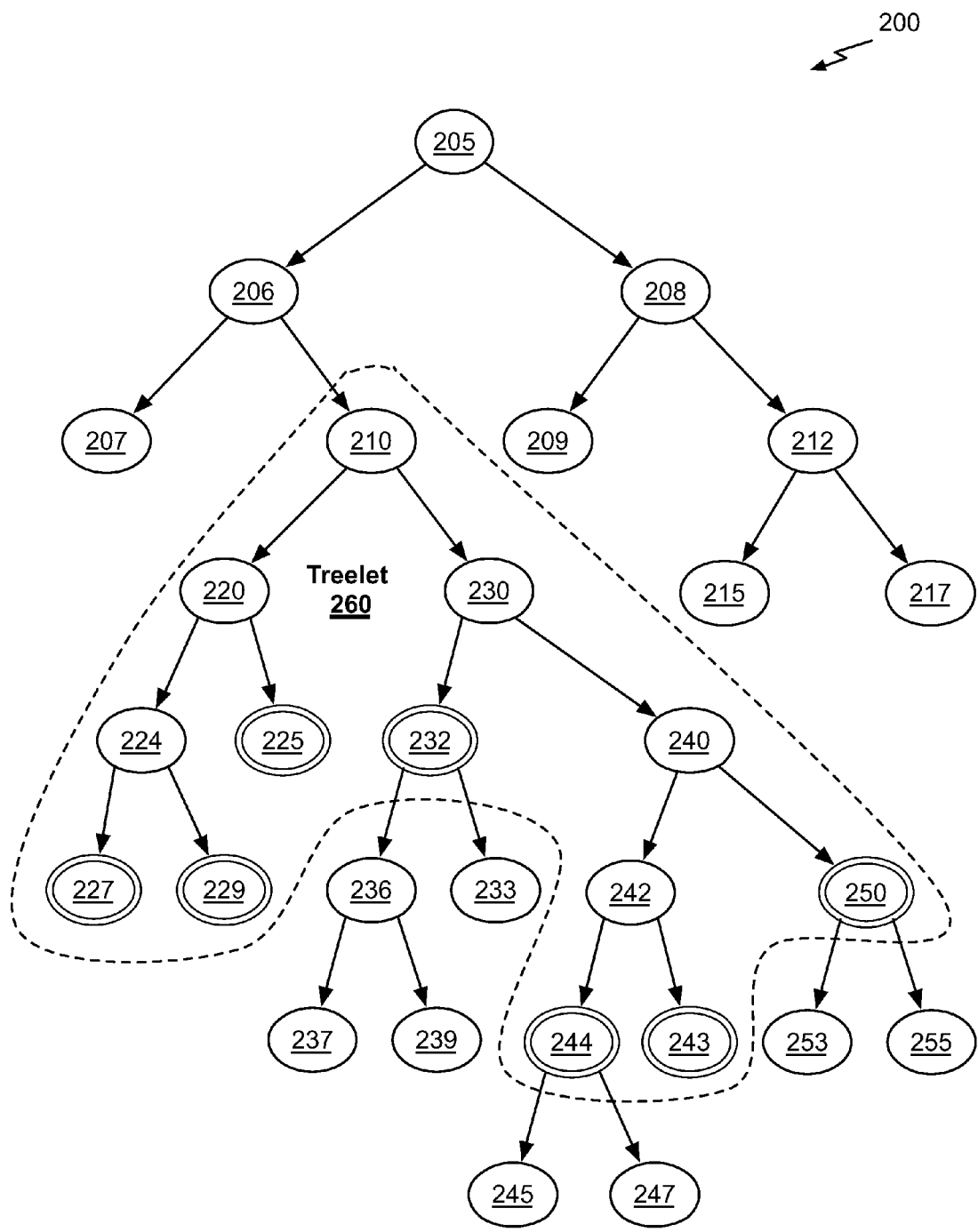
FIG. 2A illustrates a conceptual diagram of a hierarchical data structure represented by a tree, in accordance with one embodiment.

FIG. 2A illustrates a conceptual diagram of a hierarchical data structure represented by a tree 200, in accordance with one embodiment. The tree includes a treelet 260 of 7 treelet leaf nodes and 6 treelet internal nodes, including a root node 210. The nodes 205, 206, 208, and 212 and leaf nodes 207, 209, 215, and 217 are outside of the treelet 260. The leaf nodes of the treelet 260 can either be actual leaf nodes (e.g., 227, 229, 225, and 243) or arbitrary sub-trees (e.g., nodes 232, 244, and 250). The nodes 236, 237, 239, and 233 are descendants of the treelet leaf node 232 and form a subtree that is represented by the treelet leaf node 232. Similarly, the nodes 245 and 247 are descendants of the treelet leaf node 244 and form a subtree that is represented by the treelet leaf node 244. Finally, the nodes 253 and 255 are descendants of the treelet leaf node 250 and form a subtree that is represented by the treelet leaf node 250. Nodes 210, 220, 224, 230, 240, and 242 are the internal nodes of the treelet 260.

Figure 2B:
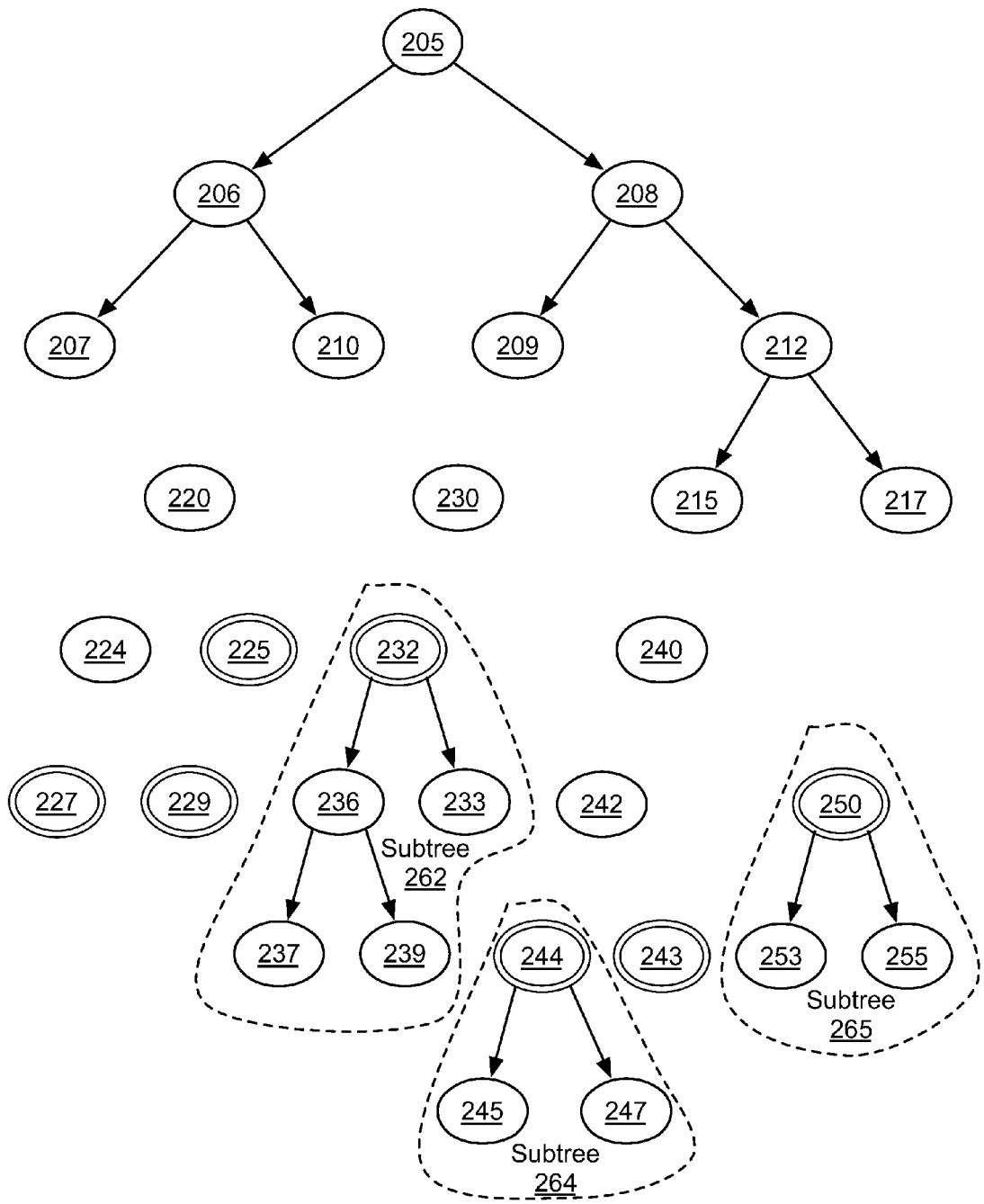
FIG. 2B illustrates a conceptual diagram of the hierarchical data structure represented by the tree of FIG. 2A during restructuring of a treelet, in accordance with one embodiment.
Figure 2C:
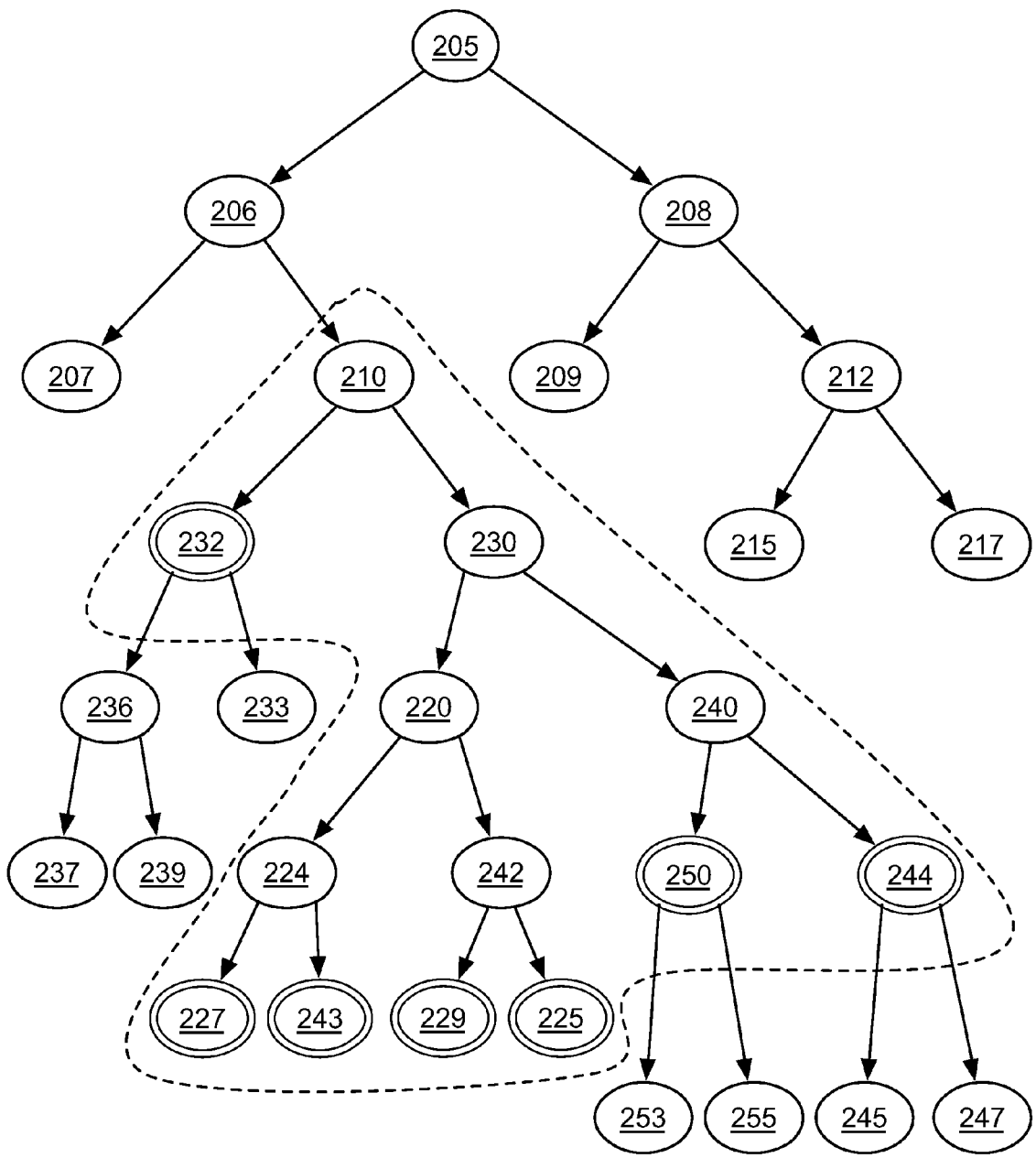
FIG. 2C illustrates a conceptual diagram of the hierarchical data structure represented by the tree of FIG. 2A after restructuring of the treelet, in accordance with one embodiment.

After the tree 200 representing a BVH is constructed, the treelet 260 is formed, and the topology of the treelet 260 and additional treelets may be restructured to produce the tree shown in FIG. 2C. The first step is to receive a treelet root node then through a "growing" process, the treelet leaf nodes are identified (e.g., internal, actual leaves, subtrees) to form a treelet, such as the treelet 260. Then, in a second step, the treelet may be restructured to produce a restructured treelet, as shown in FIGS. 2B and 2C.

To form the treelet 260, the root node 210 of the treelet 260 is identified and the child nodes 220 and 230 of the treelet root node 210 are designated as initial treelet leaves. For the purpose of treelet restructuring, the surface area of a treelet's internal nodes may provide a good indicator of the potential for reducing the SAH cost. Therefore, a goal of the treelet formation is to produce a treelet that maximizes the total surface area of the internal nodes. The formation may start with a small treelet including a treelet root and two treelet leaf nodes. The treelet is then grown iteratively, by choosing the treelet leaf node with the largest surface area and turning the chosen treelet leaf node into a treelet internal node. The treelet leaf node is converted into an internal node by removing the chosen treelet leaf node from the set of treelet leaf nodes and using the two children of the chosen node as new treelet leaf nodes. When this process is repeated, 5 iterations are needed to reach n=7.

The treelet 260 is grown by the following sequence of steps:
1. The initial treelet leaf nodes 220 and 230 are converted into treelet internal nodes. The node 220 has child nodes 224 and 225, and the node 230 has child nodes 232 and 240. Converting nodes 220 and 230 to treelet internal nodes turns the four nodes 224, 225, 232, and 240 into new treelet leaf nodes.
2. The treelet 260 may be further grown by converting one or more of the treelet leaf nodes 224, 232, 240 into treelet internal nodes. As shown in FIG. 2A, the treelet leaf node 240 is converted into a treelet internal node and the treelet leaf node 232 remains as a treelet leaf node having descendant nodes 236, 237, 239, and 233,
3. The child nodes of the treelet internal node 240 turn into new treelet leaf nodes 242 and 250.
4. The treelet leaf node 242 is further converted into a treelet internal node and the treelet leaf node 250 remains as a treelet leaf node having child nodes 253 and 255.
5. The child nodes of the treelet internal node 242 turn into new treelet leaf nodes 244 and 243.
6. The treelet leaf node 224 is converted into a treelet internal node and its child nodes 227 and 229 become new treelet leaf nodes.

As shown in FIG. 2A, the treelet 260 includes n=7 leaf nodes and n−1=6 internal nodes. The treelet 260 is a valid binary tree.

FIG. 2B illustrates a conceptual diagram of the hierarchical data structure represented by the tree 200 during restructuring of the treelet 260, in accordance with one embodiment. The topology of the treelet 260 and the additional treelets may be reorganized to minimize the overall SAH cost of the BVH. The treelet internal nodes 230, 220, 224, 240, and 242 may be reorganized to modify the topology of the treelet 260. The treelet leaf nodes 225, 227, 229, 232, 244, 243, and 250 may also be reorganized to modify the topology of the treelet 260.

Descendants of a treelet leaf node are kept intact, even when the location of the leaf node in the treelet 260 changes. For example, the topology of a first subtree 262 that includes the treelet leaf node 232 and the descendant nodes 236, 237, 239, and 233 is kept intact. Similarly, the topology of a second subtree 265 that includes the treelet leaf node 250 and the descendant nodes 253 and 255 is kept intact. The topology of a third subtree 264 that includes the treelet leaf node 244 and the descendant nodes 245 and 247 is also kept intact.

FIG. 2C illustrates a conceptual diagram of the hierarchical data structure represented by the tree 200 after restructuring of the treelet 260, in accordance with one embodiment. During restructuring, the topology of the treelet 260 is updated and the AABB values for the internal nodes are also updated. The set of children of all six treelet internal nodes (210, 230, 220, 240, 224, and 242) have been modified by the restructuring.

For example, as shown in FIG. 2A, the set of children for the treelet root node 210 includes treelet internal nodes 220 and 230. In FIG. 2C, the set of children for the treelet root node 210 includes treelet internal nodes 232 and 230. As shown in FIG. 2A, the set of children for the treelet internal node 230 includes treelet leaf node 232 and treelet internal node 240 and in FIG. 2C, the set of children for the treelet internal node 230 includes treelet internal nodes 220 and 240. As shown in FIG. 2A, the set of children for the treelet internal node 220 includes treelet leaf node 225 and treelet internal node 224 and in FIG. 2C, the set of children for the treelet internal node 220 includes treelet internal nodes 242 and 224. As shown in FIG. 2A, the set of children for the treelet internal node 240 includes treelet leaf node 250 and treelet internal node 242 and in FIG. 2C, the set of children for the treelet internal node 240 includes treelet leaf nodes 250 and 244. As shown in FIG. 2A, the set of children for the treelet internal node 224 includes treelet leaf nodes 227 and 229 and in FIG. 2C, the set of children for the treelet internal node 224 includes treelet leaf nodes 227 and 243. As shown in FIG. 2A, the set of children for the treelet internal node 242 includes treelet leaf nodes 227 and 229 and in FIG. 2C, the set of children for the treelet internal node 242 includes treelet leaf nodes 229 and 225.

The order of the treelet leaf nodes in the restructured treelet shown in FIG. 2C is changed compared with the initial treelet 200 shown in FIG. 2A. For example, the depth-first order of the treelet leaf nodes in FIG. 2A is 227, 229, 225, 232, 244, 243, and 250 and the depth-first order of the treelet leaf nodes in FIG. 2C is 232, 227, 243, 229, 225, 250, and 244.

Figure 3:
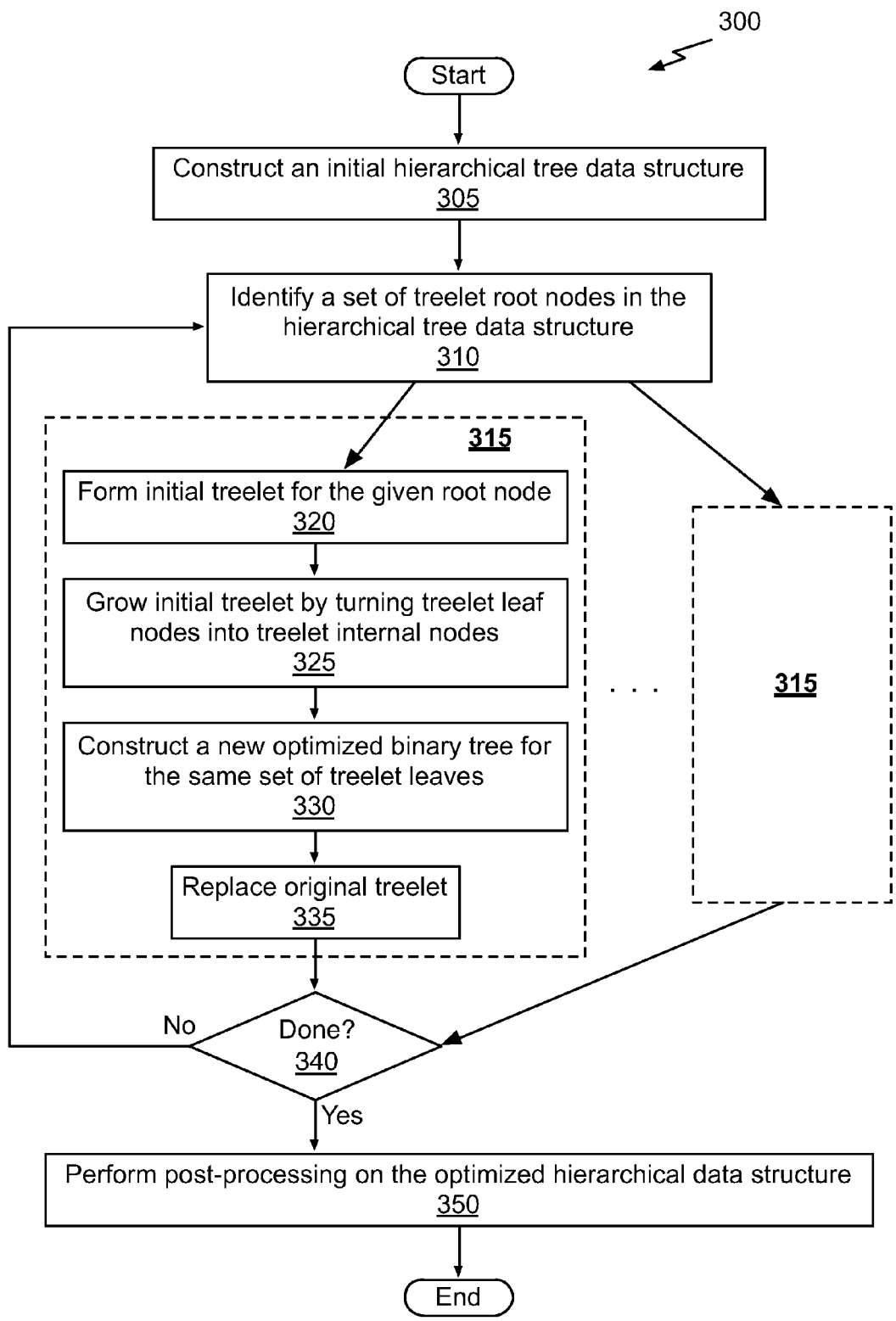
FIG. 3 illustrates another flowchart of a method for generating a hierarchical tree data structure, in accordance with one embodiment.

FIG. 3 illustrates another flowchart of a method 300 for generating a hierarchical tree data structure, in accordance with one embodiment. Although the method 300 is described in the context of a program executed by a processor, the method 300 may also be performed by custom circuitry or by a combination of custom circuitry and a program. At step 305, an initial hierarchical tree data structure is constructed by the processor. In one embodiment, the hierarchical tree data structure may be a BVH that is constructed using a method presented by Karras in 2012 using 60-bit Morton codes to ensure accurate spatial partitioning even for large scenes. The initial BVH stores a single primitive reference in each leaf node, and this property is maintained throughout the optimization of the BVH.

At step 310, a set of nodes to be used as treelet roots is identified. To identify the roots, the parallel bottom-up traversal algorithm presented by Karras in 2012 may be used. The algorithm works by traversing paths from the hierarchical tree data structure leaf nodes to the root in parallel, using atomic counters to terminate a first execution thread to enter any given node while allowing a second execution thread to proceed. The algorithm guarantees that the nodes are visited in a strict bottom up order: when a particular node is visited during the traversal, all of the node's descendants have already been visited. Therefore, the descendants may be restructured without the danger of other execution threads trying to access the descendants during the restructuring. The bottom-up traversal also provides a very natural way to propagate SAH costs of each node up the tree.

Step 315 includes steps 320, 325, 330, and 335. Step 315 may be performed by the processor in parallel to simultaneously form and restructure multiple treelets. At steps 320 and 325, the processor forms treelets of node neighborhoods in the hierarchical tree data structure (i.e., BVH), based on the treelet roots identified at step 310. Treelet formation includes identification of the treelet internal nodes and the treelet leaf nodes, including treelet leaf nodes representing subtrees, of each treelet. In one embodiment, each node of the hierarchical tree data structure is included in at most one of the multiple treelets that may be restructured concurrently.

At steps 330 and 335, a treelet and additional treelets are restructured in parallel by the processor to produce an optimized hierarchical tree data structure. The restructuring operates by first constructing a new binary tree (i.e., a restructured treelet) for the same set of treelet leaves. The new binary tree may replace the original treelet according to a cost function to produce an optimized treelet in the hierarchical data structure. The goal of the optimization is to minimize the SAH cost of the final tree that is produced by the optimization. Therefore, the new binary tree replaces the original treelet if a cost function (e.g., SAH cost) indicates that the optimized treelet improves the hierarchical tree data structure. Otherwise, the original treelet is retained. At step 340, the processor determines if the optimization of each treelet in the hierarchical tree data structure is complete, and, if so, the processor proceeds to step 350. The completion at step 340 may be based on, for example, a pre-defined number of iterations or changes in a cost metric of the hierarchical tree data structure.

Because the number of primitives in the leaf nodes of the hierarchical tree data structure is known to have a significant impact on ray tracing performance, any individual subtrees within a treelet are collapsed into treelet leaf nodes during the post-processing step 350.

The SAH cost, C(n) of a given subtree associated with a node may be calculated as the minimum over the two possible outcomes:

$$C(n) = \min \begin{cases} C_i A(n) + C(n_l) + C(n_r) & (n \in I) \\ C_t A(n) N(n) & (n \in L) \end{cases} \quad (2)$$

where n is the root of the subtree, $n_l$ and $n_r$ are its left and right child nodes, and N(n) indicates the total number of primitives contained in the subtree. The first case corresponds to making n an internal node, whereas the second case corresponds to collapsing the entire subtree into a single leaf node. In one embodiment, whichever alternative yields the lowest SAH cost may be chosen, so C(root)/A (root) gives the same result as Equation 1 for the final optimized hierarchical tree data structure. In practice, N(n) and C(n) may be initialized during the AABB fitting step of the initial BVH construction during step 305 and may be updated throughout the optimization.

The main benefit of selecting the alternative that yields the lowest SAH cost, is that the processing of leaf nodes and internal nodes is unified so that the same algorithm may be used for optimizing both—moving nodes in the treelets of the intermediate tree effectively enables refinement of the leaf nodes of the final hierarchical tree data structure that is produced by the optimization.

In one embodiment, the optimized hierarchical tree data structure that is produced should be readily usable with existing ray tracing kernels, such as the ray tracing kernel described by Aila et al. in 2012, the final post-processing stage performs several operations. At step 350, the post-processing should identify the subtrees to be collapsed into leaf nodes, collect the triangles of the identified subtrees into linear lists, and output the linear lists. In one embodiment, the triangles are represented in a format suitable for processing using Woop's intersection test. The subtrees may be identified by locking at the value of C(n) for each node. If the value corresponds to the second case in Equation 2, but the same is not true for the ancestors of n, the node is collapsed into a leaf node. The collapsing operation may be accomplished by traversing the subtree to identify the individual triangles, and then using an atomic counter to place them in the output array to produce the linear list.

Several different methods may be used to find the optimal topology for the nodes in the treelet for given treelet root during the optimization process. A naïve algorithm is described first, and then incremental refinements are made to the naïve algorithm to arrive at an efficient GPU implementation. Throughout the following description, a fixed treelet size of n=7 leaf nodes is used to illustrate various algorithmic details in concrete terms. However, in other embodiments, different values of n may be used, including values that are smaller or larger than 7.

FIG. 4A illustrates example code 400 of a function for performing step 330 of FIG. 3, in accordance with one embodiment. After forming a treelet of size n (steps 320 and 325), the treelet topology may be optimized (step 330). One method to accomplish this is to consider each possible binary tree in turn and choose the best one, as also described in conjunction with step 330 of the method 300.

As shown in FIG. 4A, a recursive function ConstructOptimalTree may be used to implement the function. The example code 400 constructs the optimal binary tree ($T_{opt}$) that minimizes the SAH cost ($c_{opt}$) for a given set of treelet leaf nodes (S). Each way of partitioning the leaf nodes is tried, so that some of the leaf nodes (P) are assigned to the left subtree of the root node while the rest of the leaf nodes (S\P) are assigned to the right subtree. The subtrees are, in turn, constructed by repeating the same process recursively.

The function ConstructOptimalTree takes set of treelet leaf nodes S as a parameter and returns the optimal tree $T_{opt}$ along with its SAH cost $c_{opt}$. If S consists of a single leaf, the function looks up the associated SAH cost and returns (lines 3-6). Otherwise, the function tries each potential way of partitioning the leaf nodes into two subsets (line 9). A partitioning is represented by set P that indicates which leaf nodes should go to the left subtree of the root; the rest will go the right subtree. For P to be valid, neither subtree can be empty (line 10).

For each partitioning, the algorithm proceeds to construct the subtrees in an optimal way by calling itself recursively (lines 12-13). It then calculates the SAH cost of the full tree obtained by merging the subtrees (lines 15-16). This corresponds to the first case of Equation 2, where the AABB of the root is calculated as the union of the AABBs in S. The algorithm maintains the best solution found so far in $T_{opt}$ and $c_{opt}$ (line 8), and replaces the best solution with the current solution if the current solution results in an improved SAH cost (lines 18-21).

In the end, $c_{opt}$ corresponds to the lowest SAH cost that can be obtained by creating at least one internal node, but it does not account for the possibility of collapsing the entire subtree into a single leaf node. As per the policy of maintaining one primitive per leaf node throughout the optimization, the collapsing is not performed until the final post-processing stage. However, the possibility of collapse is accounted for by evaluating the second case of Equation 2 at the end, and returning whichever of the two costs is lower (lines 25-28).

While the naïve algorithm shown in FIG. 4A is straightforward, it may be inefficient. For instance, n=7 results in a total of 1.15 million recursive function calls and an even larger number of temporary solutions that are immediately discarded afterwards. To transform the algorithm into a more efficient form that produces an identical result, the following three important modifications may be made:

1. Remove the recursion and perform the computation in a predetermined order instead.
2. Represent S and P as bitmasks, where each bit indicates whether the corresponding leaf node is included in the set.
3. Memorize the optimal solution for each subset, using the hit masks as array indices.

The three modifications lead to a bottom-up dynamic programming approach. Because solutions to all subproblems are needed in order to solve the full problem, the small subproblems are solved first and the results are used to solve the larger problems. Given that the solution for subset S depends on the solutions for all $P \subset S$, a natural way to organize the computation is to loop over k=2 . . . n and consider subsets of size k in each iteration. Each subset of size k is a subproblem that is solved. In this manner, every iteration depends on the results of the previous iteration, but there are no dependencies within the iterations themselves.

FIG. 4B illustrates example code 420 for performing step 330 of FIG. 3 using dynamic programming, in accordance with one embodiment. In code 420, the full set of leaf nodes is represented as an ordered sequence L, and use bitmasks $\bar{s}$ and $\bar{p}$ to indicate which elements of L would be included in the corresponding sets S and P in the naïve variant shown in the example code 400. The algorithm starts by calculating the surface area of each potential internal node and storing the results in array a (lines 2-4). Calculating the AABBs has different computational characteristics compared to the other parts of the algorithm, so performing the AABB calculation in a separate loop is a good idea considering the parallel implementation.

The algorithm handles subsets corresponding to individual leaf nodes as a special case (lines 6-8). It then proceeds to optimize the remaining subsets in increasing order of size (lines 10-11). The optimal SAH cost of each subset is stored in array $c_{opt}$, and the corresponding partitioning is stored in an array, $\bar{p}_{opt}$. Keeping track of the different partitionings of the leaf nodes avoids the need to construct temporary trees—once all subsets have been processed, reconstructing the optimal tree is a matter of backtracking the choices recursively starting from $\bar{p}_{opt}[2^n-1]$.

Processing a given subset is very similar to the naive algorithm. Each possible way of partitioning the leaf nodes (lines 14-17) is tried, maintaining the best solution found so far in temporary variables $c_{\bar{s}}$ and $\bar{p}_{\bar{s}}$ (line 13). Then, the final SAH cost is calculated and the results are recorded in $c_{opt}$ and $\bar{p}_{opt}$ (lines 19-21). As an optimization, it may be observed that the first term of the SAH cost, $C_i \cdot a[\bar{s}]$, does not actually depend on which partitioning is chosen. Therefore, the first term of the SAH cost is omitted from the computation in the inner loop (line 15), and is instead included in the final cost (line 20).

Most of the computation happens in the inner loop (lines 14-17) of the example code 420. For each iteration of the loop two values are looked up from $c_{opt}$ and the temporary variables $c_{\bar{s}}$ and $\bar{p}_{\bar{s}}$ are updated. The complement of $\bar{p}$, corresponding to S\P, may be obtained conveniently through a logical XOR operation, because $\bar{p}$ can only contain bits that are also set in $\bar{s}$ (line 15). Looping over the different partitionings of the leaf nodes entails enumerating all integers that have the property that they only contain bits that are set in $\bar{s}$ (line 14). However, in addition to excluding 0 and $\bar{s}$, partitionings whose complements have already been tried should also be excluded. Complement partitionings result in mirror images of the same trees, and are thus irrelevant for the purposes of minimizing the SAH cost.

FIG. 4C illustrates example code 440 for efficiently enumerating the partitionings, in accordance with one embodiment. The example code 440 may be used to implement the inner loop (lines 14-17) of the example code 420 by utilizing the borrowing rules in two's complement arithmetic. The loop executes $2^{k-1}-1$ iterations in total, where k is the number of hits that are set in S.

The idea of the example code 444) is to clear the lowest bit of $\bar{s}$ and then step through the bit combinations of the resulting value $\bar{\delta}$. Clearing the lowest bit (line 1) means that the first leaf represented by $\bar{s}$ is assigned to the right subtree of the root, which is enough to avoid enumerating complements of the same partitionings of the leaf nodes. The successor of a given value is determined by utilizing the borrowing rules of integer subtraction in two's complement arithmetic (line 6). The initial value of $\bar{p}$ can be thought of as being the successor of zero (line 2). For a subset of size k, the loop executes $2^{k-1}-1$ iterations in total, after which $\bar{p}$ wraps back to zero.

Agglomerative Treelet Restructuring

As previously explained, the quality of an existing BVH may be improved by forming small localized neighborhoods of BVH nodes, i.e., treelets, and restructuring the node topology of each treelet in parallel. A parallel bottom-up traversal algorithm is used to form sets of non-overlapping treelets, and each resulting treelet is then restructured in isolation. Multiple treelets can be processed in parallel, and it is also possible to employ multiple threads to process a given treelet. The restructuring of a treelet may be performed using dynamic programming to find the optimal node topology for a given treelet that minimizes the overall SAH cost of the BVH.

A drawback of the approach is that the computational cost of restructuring a treelet grows exponentially with respect to the number of leaves in the treelet. Therefore, in practice the number of leaves may be limited to less than ten. When the size of the treelet is limited the extent of the individual BVH modifications that can be performed is also limited, which in turn limits the achievable BVH quality. To improve the BVH quality without limiting the number of leaves in each treelet, so that larger treelets may be restructured, agglomerative clustering may be used. Agglomerative clustering is a "bottom up" approach to building a hierarchy of clusters, merging clusters as the hierarchy is constructed from bottom to top.

Figure 5A:
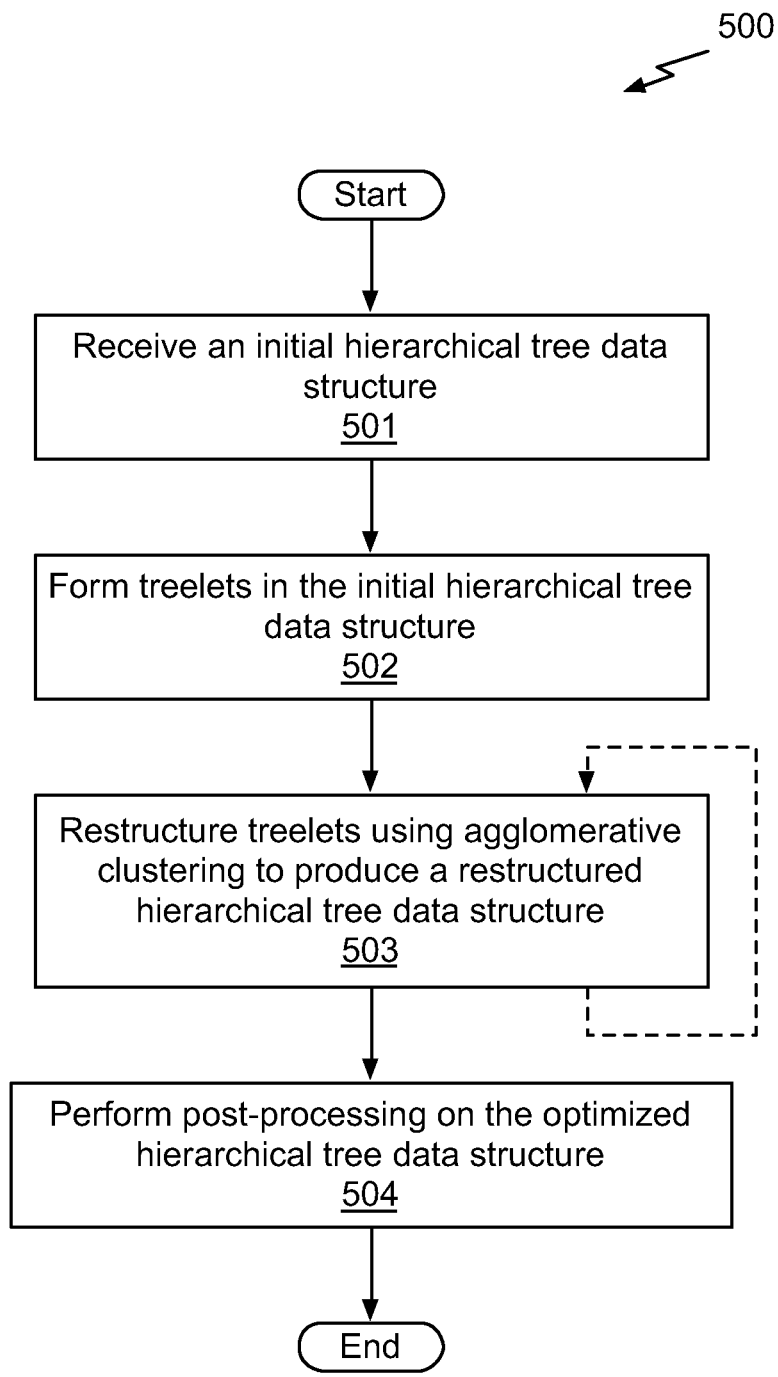
FIG. 5A illustrates a flowchart of a method for generating a hierarchical tree data structure that is restructured using agglomerative clustering, in accordance with one embodiment.

FIG. 5A illustrates a flowchart of a method 500 for generating a hierarchical tree data structure that is restructured using agglomerative clustering, in accordance with one embodiment. At step 501, an initial hierarchical tree data structure is received. In one embodiment, the hierarchical tree data structure may be a BVH. At step 502, treelets are formed in the initial hierarchical tree data structure, each treelet comprising a neighborhood of nodes in the hierarchical tree data structure. In one embodiment, a parallel bottom-up traversal algorithm is used to form sets of non-overlapping treelets. The sets of non-overlapping treelets may be formed based on a Surface Area Heuristic (SAH) cost analysis.

At step 503, the treelets are restructured using agglomerative clustering to produce a restructured hierarchical tree data structure. One or more treelets of the restructured hierarchical tree data structure may include n treelet leaf nodes and n−1 treelet internal nodes, where n is greater than 2 and may even be greater than 10. As a result of the agglomerative clustering, the topology of the initial hierarchical tree data structure is modified to produce the restructured hierarchical tree data structure. In one embodiment, multiple treelets can be processed in parallel, and it is also possible to employ multiple threads to process a given treelet. At step 504, post-processing is performed on the optimized hierarchical tree data structure to collapse subtrees into leaf nodes to prepare the optimized hierarchical tree data structure for ray-tracing operations. In one embodiment, step 503 may be repeated multiple times to produce the optimized hierarchical tree data structure.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Generally, agglomerative clustering operates by merging nodes in a bottom-up fashion, maintaining a set of nodes yet to be merged. An agglomerative clustering algorithm starts with the individual treelet leaf nodes, and, in each iteration of processing, out of the set of nodes yet to be merged, the two whose union has the lowest surface area is identified. The two nodes are then merged by creating a new internal node. Repeating the algorithm, the newly created internal nodes will eventually be merged in the same fashion until only one node remains: the root node of the resulting BVH. Walter et al. 2008 "Fast agglomerative clustering for rendering" In Proc. IEEE Symposium on Interactive Ray Tracing, describes using an agglomerative clustering technique to construct a BVH for rendering without restructuring the BVH.

The initial hierarchical tree data structure that is received at step 501 may be constructed using any feasible technique. Each of the treelets within the initial hierarchical tree data structure may then be restructured using agglomerative clustering. A bottom-up merging is performed starting with the treelet leaf nodes to produce a new topology for the treelet internal nodes. Assuming that the number of treelet leaves is in the order of 10-100 (as opposed to millions), the restructuring may be performed efficiently by multiple parallel threads.

Figure 5B:
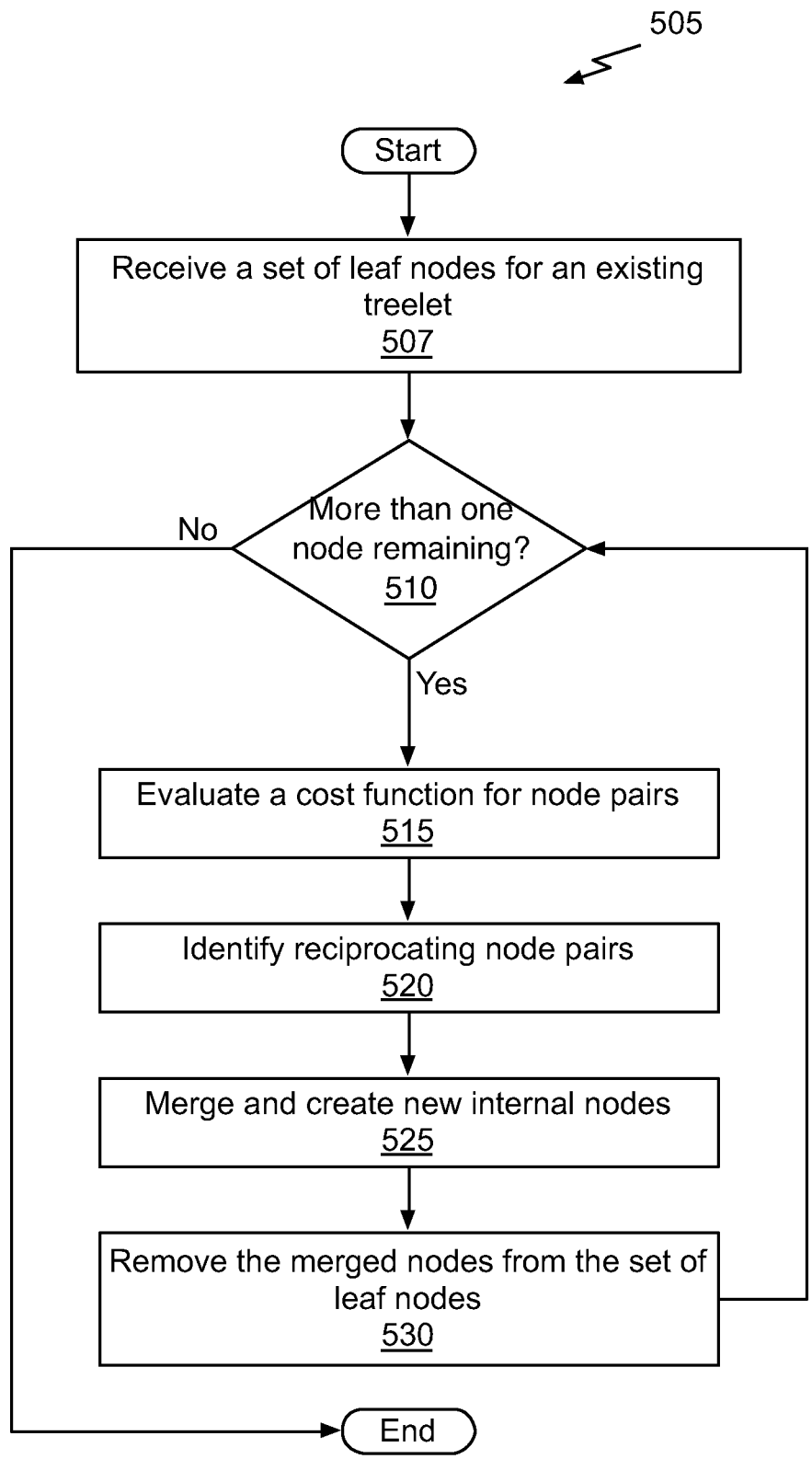
FIG. 5B illustrates a flowchart of a method for restructuring a treelet, in accordance with one embodiment.

FIG. 5B illustrates a flowchart of a method 505 for restructuring a treelet, accordance with one embodiment. Although the method 505 is described in the context of a program executed by a processor, the method 505 may also be performed by custom circuitry or by a combination of custom circuitry and a program. At step 507, a set of treelet leaf nodes is received where a treelet leaf node either corresponds to an actual leaf node of the BVH or acts as a representative of an arbitrary subtree within the initial hierarchical tree data structure. In one embodiment, a processing thread may be allocated and launched to process each node in the set. At step 510, the processor determines if more than one node remains in the set of nodes yet to merged, and, if not, the process terminates and the treelet has been restructured.

Otherwise, at step 515, the processor evaluates a cost function for each possible pair of nodes in the set. For each node in the set, the processor determines the node pair having the lowest SAH cost. To determine whether a given pair of nodes should be merged when constructing a BVH, agglomerative clustering traditionally calculates the union of a bounding volume that encloses the pair of nodes and uses the surface area of the bounding volume as a cost function. In one embodiment, rather than using the surface area of the bounding volume, at step 515, the following cost function, MergeCost, is evaluated:

$$\text{MergeCost}(a,b)=C(a,b)-C(a)-C(b)+(A(a,b)-A(b)))^*Z,$$

where a and b are the two nodes to be merged, C(a) and C(b) are the SAH costs of their corresponding subtrees, as defined in Equation 2, and A(a) and A(b) are the surface areas of the two nodes. Furthermore. A(a,b) is the surface area of the union bounding volume for the two nodes, C(a,b) is the SAH cost of the subtree that would result from merging the two nodes and may be calculated according to Equation 2. Z is a free parameter, and in practice, Z=1 has been found to give the best results. In practice, the MergeCost cost function has been found to result in 4%-10% better ray tracing performance compared with using the surface of the bounding volume as the cost function.

The MERGECOST cost function estimates the difference in the overall SAH cost between two cases: (1) merging the two nodes with each other; and (2) merging the two nodes with some other nodes. A given node i contributes to the overall SAH cost in two ways: (1) descendants of the node contribute C(i); and (2) ancestors of the node contribute some unknown amount that may be estimated to be A(i)*Z. In effect, MERGECOST(a, b) is the total contribution of the newly created internal node minus the total contributions of node a and node b.

Before the processor proceeds to step 520, the execution of the threads should be synchronized. At step 520, the processor identifies reciprocating node pairs, where the computed cost of the pair is the lowest for both nodes in the pair compared with other pairings that include either of the nodes. In other words, for two nodes a and b, the cost of the merged node (a,b) is the lowest cost of any pairing that includes either node a or node b. At step 525, the processor merges each pair of nodes in an identified reciprocating node pair, thereby creating one or more new internal nodes. At step 530, the processor removes the nodes identified as reciprocating node pairs from the set of nodes and includes the new internal nodes in the set of nodes before returning to step 510. The newly created internal nodes may be assigned to the thread that was responsible for processing one of the nodes in the reciprocating node pair, and the thread that was responsible for processing the other node in the reciprocating node pair is deallocated. Before the processor returns to step 510, the execution of the remaining allocated threads should be synchronized.

In contrast with the method 505, conventional techniques select a single pair of nodes (e.g. the one having the lowest cost) and merge the selected pair of nodes so that only a single merged node is created during each iteration of the agglomerative clustering process. Thus, the set of nodes decreases by only one node for each iteration.

FIG. 5C illustrates example code 535 for restructuring a treelet using agglomerative clustering, in accordance with one embodiment. The example code 535 may be implemented to perform the method 505 shown in FIG. 5B. As previously described in conjunction with step 515, an $O(n^2)$ search is performed over the nodes in the set and the result of the MergeCost evaluation for the node pairs is used to merge as many nodes as possible during each iteration. The set N (line 1) represents the nodes yet to be merged, and the main loop (lines 2-19) is executed until there is only one node remaining. For each iteration, a node pairing having the lowest cost is determined for each node in the set (lines 3-11). For node n, finding the node pairing with the lowest cost is a matter of considering each node p in turn (line 5), calculating the expected cost of merging n and p (line 6), and choosing the pair that gives the lowest cost $c_n$ (line 7). After the lowest cost pairing is determined for each node, the reciprocating node pairs may be identified. To perform the merges, the code loops over the nodes (line 12), identifies the reciprocating node pairs (lines 13), and merges the nodes of reciprocating node pairs (lines 14-16).

In practice, the algorithm can be parallelized over a group of threads by assigning one of the treelet leaf nodes to each thread. Both phases of the algorithm (lines 3-11 and lines 12-19) parallelize naturally over the set N. However, the execution of the threads should be synchronized when transitioning from one phase to the other. When performing a merge (lines 14-16), the newly created internal node r is assigned to the thread that was responsible for n, and the thread that was responsible for P[n] exits the loop. As an additional performance optimization, it is possible to abort the agglomerative merging of nodes when less than a fixed number of nodes remain (i.e. |N|<T on line 2). This will not reduce the quality of the resulting BVH as long as processing of the next treelet in bottom-up order searches all of the T nodes for reciprocating node pairs.

Compared to optimal treelet restructuring (as described in conjunction with FIGS. 1-4C), agglomerative restructuring enables processing of significantly larger treelets at substantially the same computational cost. In test cases, agglomerative restructuring with n=16 treelet leaves was found to yield the same BVH quality and the same execution time as optimal restructuring with n=7 treelet leaves on the average. In practice, the results varied for different scenes so that agglomerative clustering resulted in 8%-15% better ray tracing performance for some scenes, whereas for other scenes, optimal restructuring was 7%-17% better. Therefore, in one embodiment, restructuring may be performed using a combination of agglomerative restructuring and optimal treelet restructuring. For example, two treelets of different sizes can be formed for each treelet root; one restructured using agglomerative restructuring and the other using optimal restructuring. Out of the two resulting tree modifications, the one having the lowest overall cost may be selected. Another way of combining the two techniques would be to run the algorithm in FIG. 5D without step 350, followed by the algorithm in FIG. 3 without step 305.

Figure 5D:
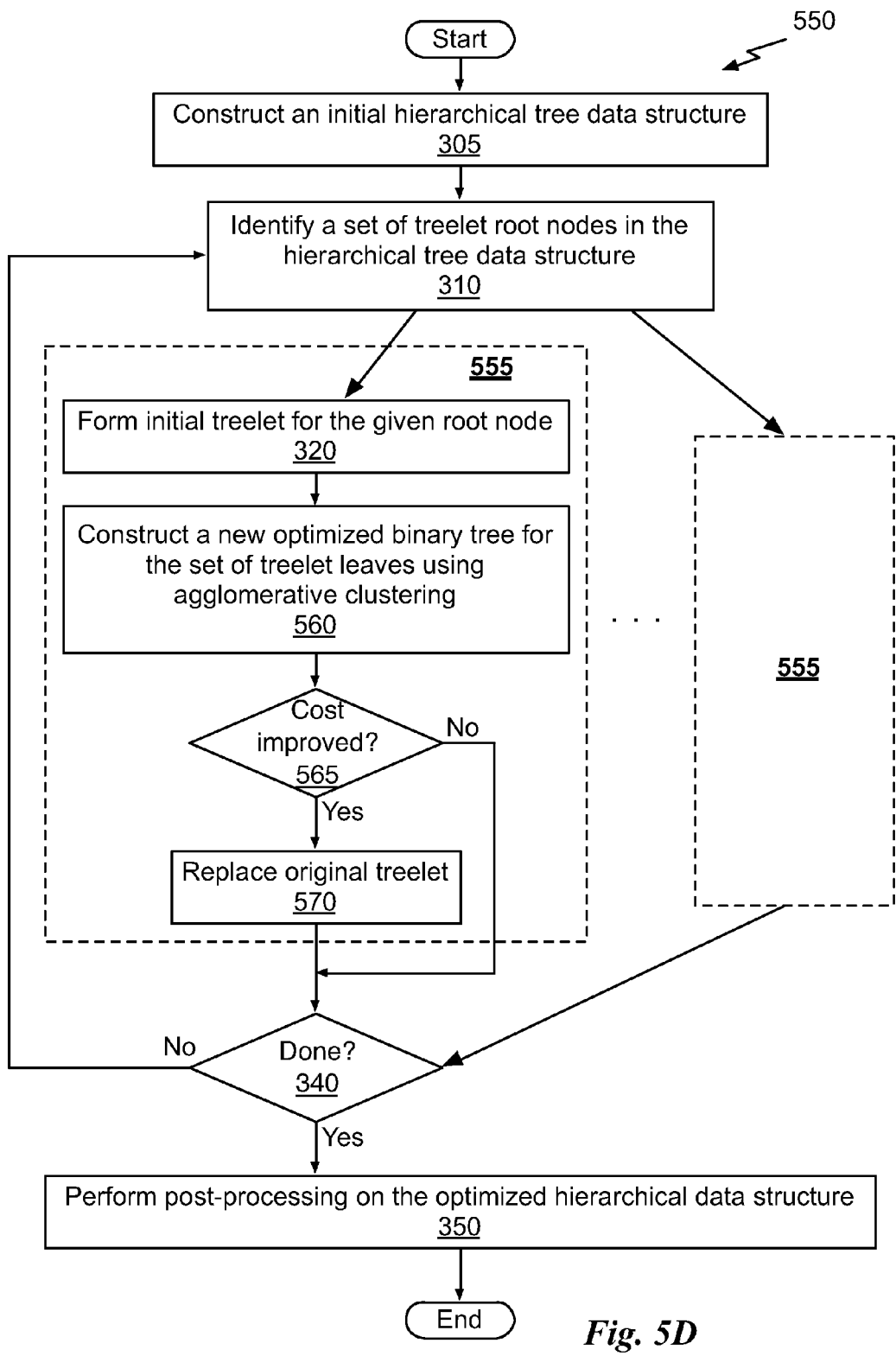
FIG. 5D illustrates another flowchart of a method for generating a hierarchical tree data structure, in accordance with one embodiment.

FIG. 5D illustrates another flowchart of a method 550 for generating a hierarchical tree data structure, in accordance with one embodiment. Although the method 550 is described in the context of a program executed by a processor, the method 550 may also be performed by custom circuitry or by a combination of custom circuitry and a program. Steps 305 and 310 are performed as previously described in conjunction with FIG. 3.

Step 555 includes steps 320, 560, 565, and 570. Step 555 may be performed by the processor in parallel to simultaneously form and restructure multiple treelets. At step 320, the processor forms treelets of node neighborhoods in the hierarchical tree data structure (i.e., BVH), based on the treelet roots identified at step 310.

At step 560, a treelet and additional treelets are restructured in parallel by the processor to produce an optimized hierarchical tree data structure. The restructuring operates by first constructing a new binary tree (i.e., a restructured treelet) for the same set of treelet leaves. The method 505 shown in FIG. 5B or the example code 535 shown in FIG. 5C may be implemented to perform step 560. At step 565, the processor determines if the cost of each restructured treelet produced using agglomerative clustering is improved (i.e., less than) compared with the original treelet. The new binary treelet may replace the original treelet according to a cost function to produce a restructured treelet in the hierarchical data structure. The goal of the optimization is to minimize the SAH cost of the final tree that is produced by the optimization. Therefore, at step 570, the new binary treelet replaces the original treelet if a cost function (e.g., SAH cost) indicates that the restructured treelet improves the hierarchical tree data structure. Otherwise, the original treelet is retained. Steps 340 and 350 are performed as previously described in conjunction with FIG. 3.

Figure 6A:
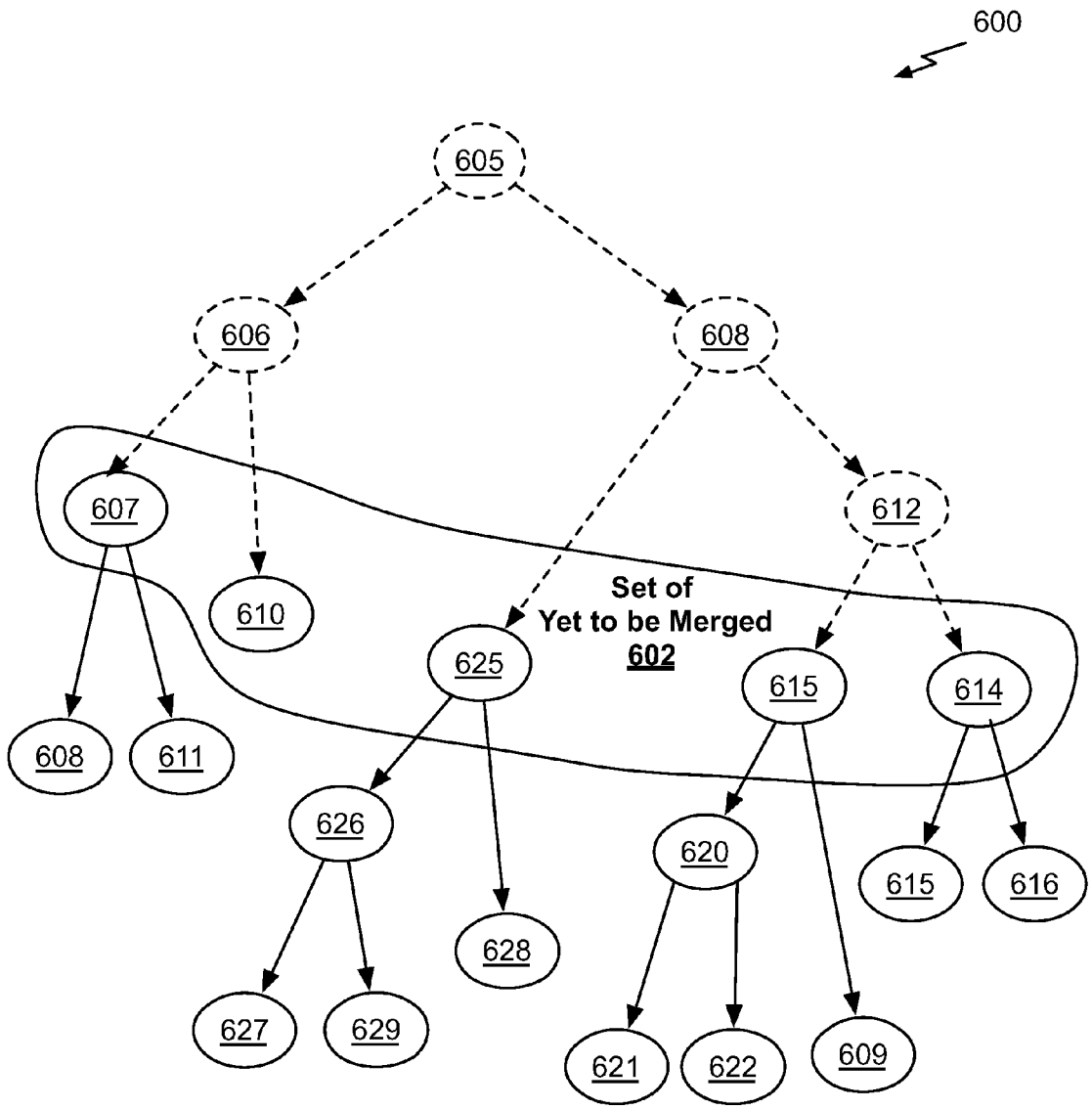
FIG. 6A illustrates another conceptual diagram of a treelet, in accordance with one embodiment.

FIG. 6A illustrates the concept behind the MergeCost cost function in the context of FIG. 5B. Restructuring of a treelet consisting of 11 treelet leaf nodes is assumed. After a few iterations of 5B some of the nodes have already been merged and the set N contains nodes 607, 610, 625, 615, and 614. Assuming the algorithm had been run to completion, the remaining internal nodes would also have gotten merged in some way (resulting in the hypothetical structure marked using dashed lines). To determine which pair of nodes to merge next in step 515, consider what would happen if nodes 614 and 615 were chosen to be merged.

The SAH cost of the nodes that have already been merged is computed as $$\sum_{n \in N} C(n)$$

and the expected SAH cost of the internal nodes that will result from subsequent merges is estimated as $$Z \cdot \sum_{n \in N} A(n),$$

where A is the surface area of each node n. The parameter converts between surface area units and surface area cost units. As previously explained, Z may be set to a value of one. The total expected SAH cost of the treelet is computed as the sum of the two previous equations $$\sum_{n \in N} (C(n) + Z \cdot A(n)).$$

Figure 6B:
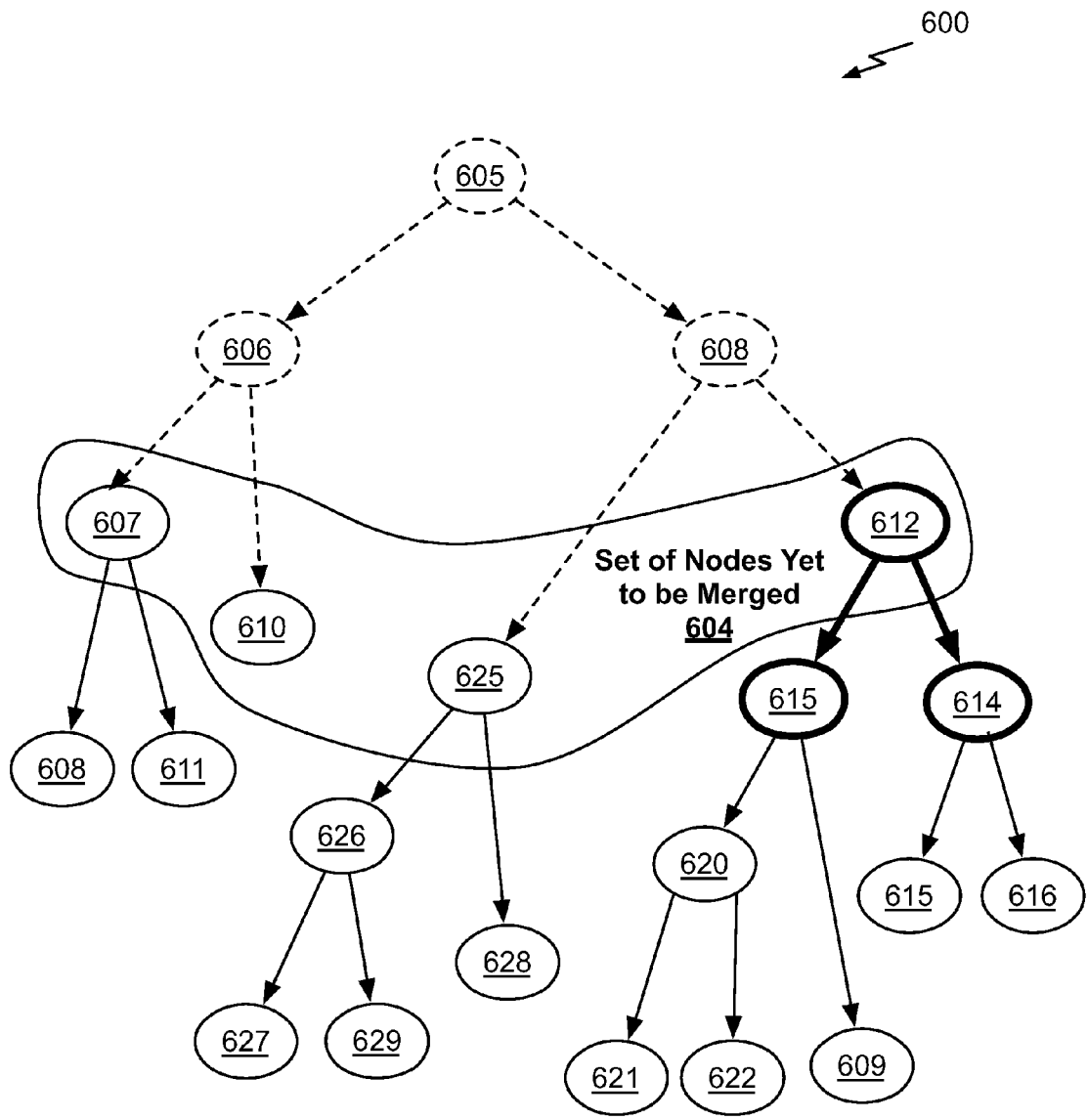
FIG. 6B illustrates a conceptual diagram of the treelet of FIG. 6A during restructuring using agglomerative clustering, in accordance with one embodiment.

FIG. 6B illustrates the result of a hypothetical merge of nodes 614 and 615. Nodes 614 and 615 have been removed from the set N, and the new internal node 612 has been added, resulting in an updated set N' (604). The SAH cost of the internal nodes that have been merged so far now becomes $$\sum_{n \in N'} C(n) = \sum_{n \in N} C(n) - C(a) - C(b) + C(a, b).$$

Then, the SAH cost of the internal n ides yet to be created is estimated as $$Z \cdot \sum_{n \in N'} A(n) = Z \cdot \left( \sum_{n \in N} A(n) - A(a) - A(b) + A(a, b) \right).$$

The change in the total SAH cost when nodes 614 and 615 are merged is estimated as $$C(a,b) - C(a) - C(b) + Z \cdot (A(a,b) - A(a) - A(b)).$$

In one embodiment, for each treelet root node, both the agglomerative clustering algorithm and the optimal treelet algorithm may be performed to produce two competing BVH structures, and then the BVH structure having the lowest SAH cost may be selected as the optimized BVH or may be processed again.

Figure 7:
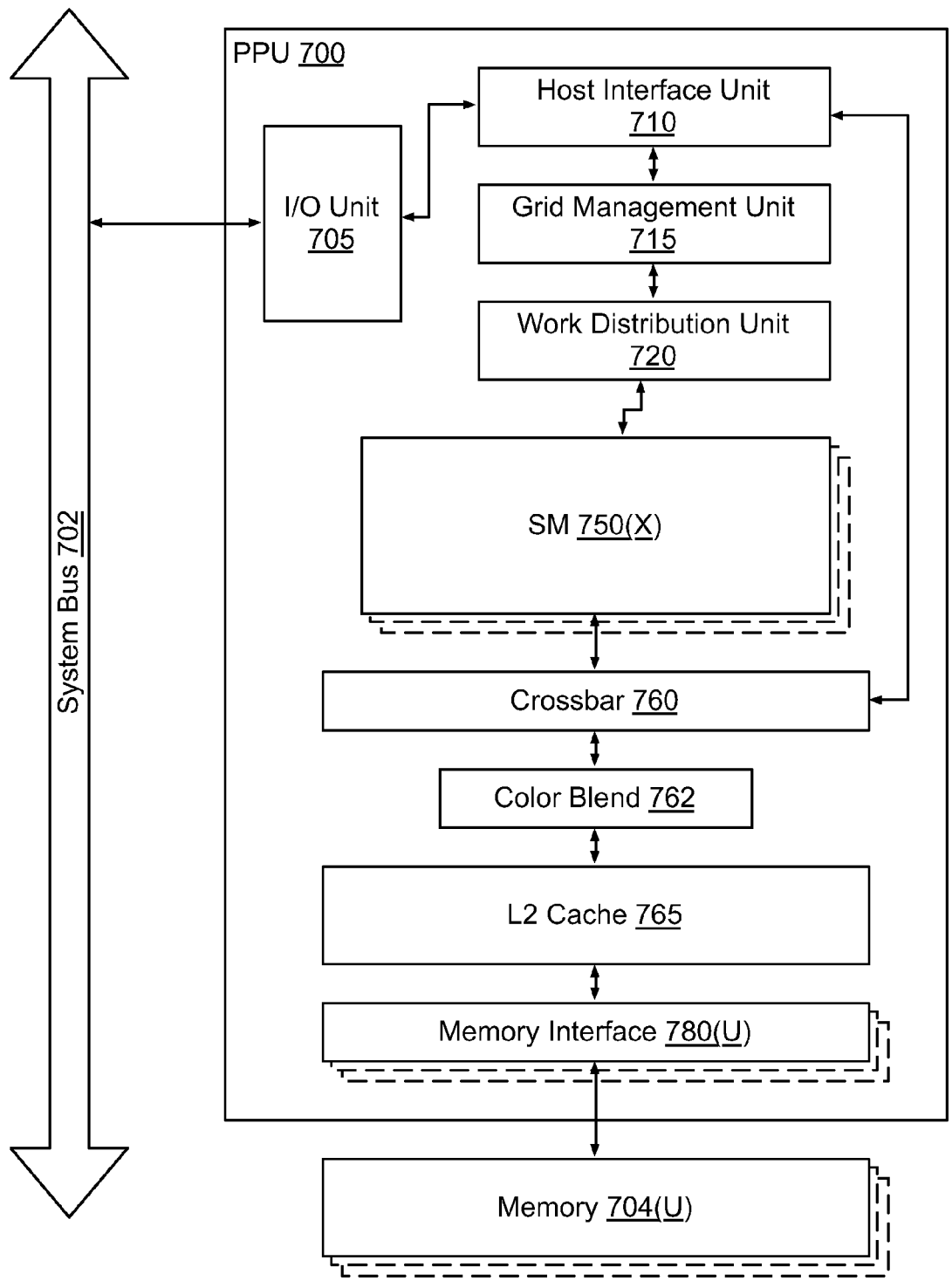
FIG. 7 illustrates a parallel processing unit (MI), according to one embodiment.

FIG. 7 illustrates a parallel processing unit (ITU) 700, according to one embodiment. While a parallel processor is provided herein as an example of the PPU 700, it should be strongly noted that such processor is set forth for illustrative purposes only, and any processor may be employed to supplement and/or substitute for the same. In one embodiment, the PPU 700 is configured to execute a plurality of threads concurrently in one or more streaming multi-processors (SMs) 750. A thread (i.e., a thread of execution) is an instantiation of a set of instructions executing within a particular SM 750. Each SM 750, described below in more detail in conjunction with FIG. 6, may include, but is not limited to, one or more processing cores, one or more load/store units (LSUs), a level-one (L1) cache, shared memory, and the like.

In one embodiment, the PPU 700 includes an input/output (I/O) unit 505 configured to transmit and receive communications (i.e., commands, data, etc.) from a central processing unit (CPU) (not shown) over the system bus 702. The 10 unit 505 may implement a Peripheral Component Interconnect Express (PCIe) interface for communications over a PCIe bus. In alternative embodiments, the I/O unit 505 may implement other types of well-known bus interfaces.

The PPU 700 also includes a host interface unit 710 that decodes the commands and transmits the commands to the grid management unit 715 or other units of the PPU 700 (e.g., memory interface 780) as the commands may specify. The host interface unit 710 is configured to route communications between and among the various logical units of the PPU 700.

In one embodiment, a program encoded as a command stream is written to a buffer by the CPU. The buffer is a region in memory, e.g., memory 704 or system memory, that is accessible (i.e., read/write) by both the CPU and the PPU 700. The CPU writes the command stream to the buffer and then transmits a pointer to the start of the command stream to the PPU 700. The host interface unit 710 provides the grid management unit (GMU) 715 with pointers to one or more streams. The GMU 715 selects one or more streams and is configured to organize the selected streams as a pool of pending grids. The pool of pending grids may include new grids that have not yet been selected for execution and grids that have been partially executed and have been suspended.

A work distribution unit 720 that is coupled between the GMU 715 and the SMs 750 manages a pool of active grids, selecting and dispatching active grids for execution by the SMs 750. Pending grids are transferred to the active grid pool by the GMU 715 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 720. In addition to receiving grids from the host interface unit 710 and the work distribution unit 720, the GMU 715 also receives grids that are dynamically generated by the SMs 750 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 700. An application may include instructions (i.e., API calls) that cause the driver kernel to generate one or more grids for execution. In one embodiment, the PPU 700 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 700 comprises X SMs 750(X). For example, the PPD 700 may include 15 distinct SMs 750. Each SM 750 is multi-threaded and configured to execute a plurality of threads (e.g., 32 threads) from a particular thread block concurrently. Each of the SMs 750 is connected to a level-two (L2) cache 565 via a crossbar 760 (or other type of interconnect network). A color blend unit 762 is configured to perform blend functions, such as the blend function used to accumulate shaded sample color values into a color buffer that may be stored in the memory 540 and cached in the L2 cache 765.

The L2 cache 765 is connected to one or more memory interfaces 780. Memory interfaces 780 implement 16, 32, 64, 128-bit data buses, or the like, for high-speed data transfer. In one embodiment, the PPU 700 comprises U memory interfaces 780(U), where each memory interface 780(U) is connected to a corresponding memory device 704(U). For example, PPU 700 may be connected to up to 6 memory devices 704, such as graphics double-data-rate, version 5, synchronous dynamic random access memory (GDDR5 SDRAM).

In one embodiment, the PPU 700 implements a multi-level memory hierarchy. The memory 704 is located off-chip in SDRAM coupled to the PPU 700. Data from the memory 704 may be fetched and stored in the L2 cache 765, which is located on-chip and is shared between the various SW 750. In one embodiment, each of the SMs 750 also implements an L1 cache. The L1 cache is private memory that is dedicated to a particular SM 750. Each of the L1 caches is coupled to the shared L2 cache 765. Data from the L2 cache 765 may be fetched and stored in each of the L1 caches for processing in the functional units of the SMs 750.

The PPU 700 may be included in a desktop computer, a laptop computer, a tablet computer, a smart-phone (e.g., a wireless, hand-held device), personal digital assistant (PDA), digital camera, a hand-held electronic device, and the like. In one embodiment, the PPU 700 is embodied on a single semiconductor substrate. In another embodiment, the PPU 700 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 700 may be included on a graphics card that includes one or more memory devices 704 such as GDDR5 SDRAM. The graphics card may be configured to interface with a PCIe slot on a motherboard of a desktop computer that includes, e.g., a northbridge chipset and a southbridge chipset. In yet another embodiment, the PPU 700 may be an integrated graphics processing unit (iGPU) included in the chipset (i.e., Northbridge) of the motherboard.

Figure 8:
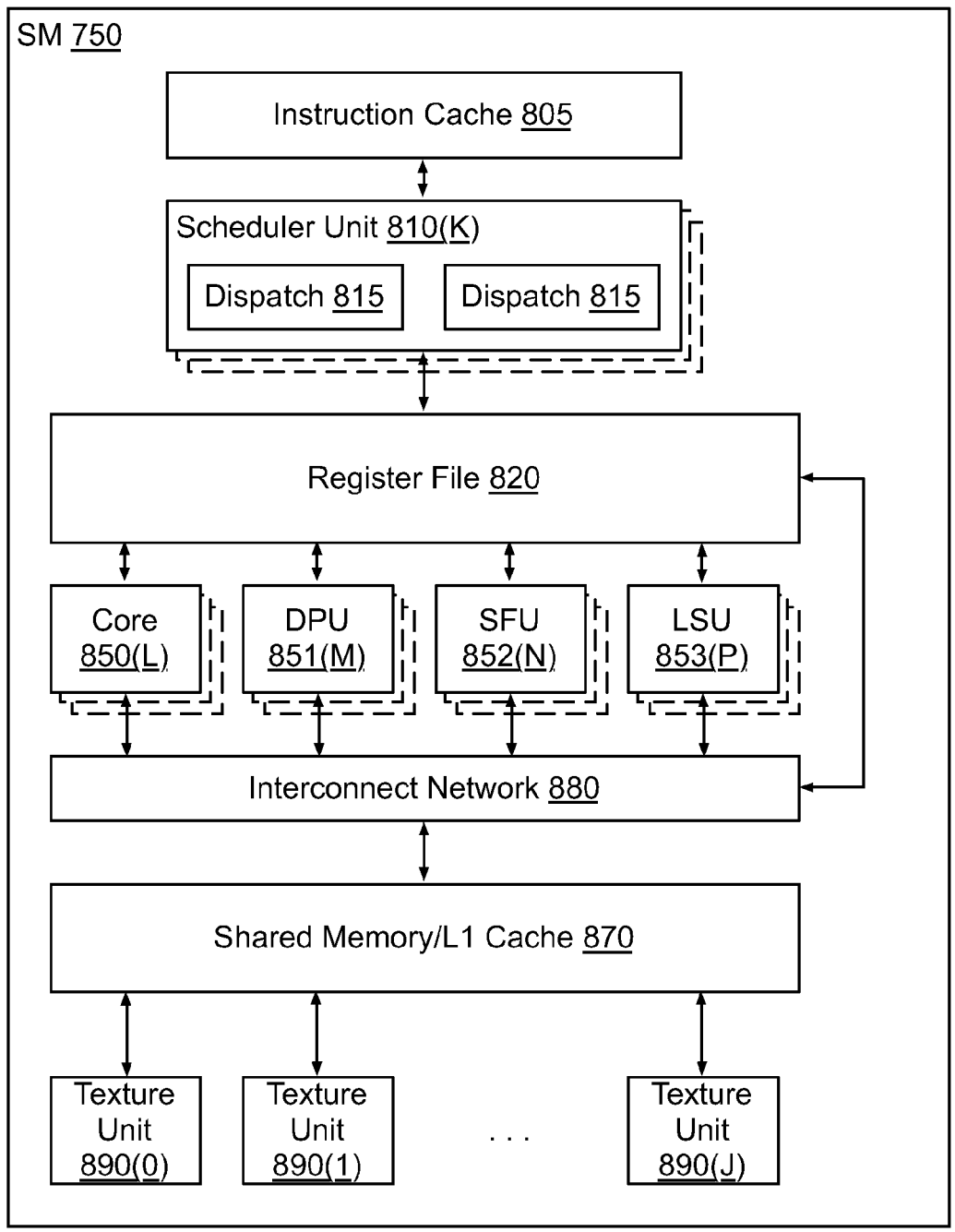
FIG. 8 illustrates the streaming multi-processor of FIG. 7, according to one embodiment.

FIG. 8 illustrates the streaming multi-processor 750 of FIG. 7, according to one embodiment. As shown in FIG. 6, the SM 750 includes an instruction cache 805, one or more scheduler units 810, a register file 820, one or more processing cores 850, one or more double precision units (DPUs) 851, one or more special function units (SFUs) 852, one or more loadstore units (LSUs) 853, an interconnect network 880, a shared memory L1 cache 870, and one or more texture units 890.

As described above, the work distribution unit 720 dispatches active grids for execution on one or more SMs 750 of the PPU 700. The scheduler unit 810 receives the grids from the work distribution unit 720 and manages instruction scheduling for one or more thread blocks of each active grid. The scheduler unit 810 schedules threads for execution in groups of parallel threads, where each group is called a warp. In one embodiment, each warp includes 32 threads. The scheduler unit 810 may manage a plurality of different thread blocks, allocating the thread blocks to warps for execution and then scheduling instructions from the plurality of different warps on the various functional units (i.e., cores 850, DPUs 851, SFUs 852, and LSUs 853) during each clock cycle.

In one embodiment, each scheduler unit 810 includes one or more instruction dispatch units 815. Each dispatch unit 815 is configured to transmit instructions to one or more of the functional units. In the embodiment shown in FIG. 6, the scheduler unit 810 includes two dispatch units 815 that enable two different instructions from the same warp to be dispatched during each clock cycle. In alternative embodiments, each scheduler unit 810 may include a single dispatch unit 815 or additional dispatch units 815.

Each SM 850 includes a register file 820 that provides a set of registers for the functional units of the SM 850. In one embodiment, the register file 820 is divided between each of the functional units such that each functional unit is allocated a dedicated portion of the register file 820. In another embodiment, the register file 820 is divided between the different warps being executed by the SM 750. The register file 820 provides temporary storage for operands connected to the data paths of the functional units.

Each SM 750 comprises L processing cores 850. In one embodiment, the SM 750 includes a large number (e.g., 192, etc.) of distinct processing cores 850. Each core 850 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 750 also comprises M DPUs 851 that implement double-precision floating point arithmetic, N SFUs 852 that perform special functions (e.g., copy rectangle, pixel blending operations, and the like), and PLSUs 853 that implement load and store operations between the shared memory/L1 cache 870 and the register file 820. In one embodiment, the SM 750 includes 64 DPUs 851, 32 SFUs 852, and 32 LSUs 853.

Each SM 750 includes an interconnect network 880 that connects each of the functional units to the register file 820 and the shared memory/L1 cache 870. In one embodiment, the interconnect network 880 is a crossbar that can be configured to connect any of the functional units to any of the registers in the register file 820 or the memory locations in shared memory/L1 cache 870.

In one embodiment, the SM 750 is implemented within a GPU. In such an embodiment, the SM 750 comprises J texture units 890. The texture units 890 are configured to load texture maps (i.e., a 2D array of texels) from the memory 704 and sample the texture maps to produce sampled texture values for use in shader programs. The texture units 890 implement texture operations such as anti-abasing operations using mip-maps (i.e., texture maps of varying levels of detail). In one embodiment, the SM 750 includes 16 texture units 890.

The PPU 700 described above may be configured to perform highly parallel computations much faster than conventional CPUs. Parallel computing has advantages in graphics processing, data compression, biometrics, stream processing algorithms, and the like. In particular, parallel computing may be used to construct a tree and restructure multiple treelets in parallel.

The bottom-up traversal algorithm that may be used to perform step 310 shown in FIGS. 3 and 5D during restructuring of multiple treelets in parallel, may have very low SIMD utilization because most of the threads terminate quickly while only a few survive until the end of the optimization. The reduction in parallelism is problematic because the optimization is computationally expensive and would ideally be performed at full utilization of an SM 750. Instead of performing the optimization independently by each thread, a group of 32 threads warp) may be used to collaboratively process each treelet. The algorithm used to perform the restructuring should allow parallel execution, such as the algorithm shown in FIG. 4B. Since every treelet occupies 32 threads instead of one, it is enough to have only a modest number of treelets in flight to employ an entire Pal 700. Therefore, more on-chip memory is available for processing each treelet, and the scalability of the algorithm is also improved.

Compared to the code example 400, the code example 420 represents roughly a thousand-fold improvement in terms of execution speed resulting from increased parallelism. However, as a practical matter, the memory space consumed during execution of the example code 400 or 420 for a tree should also be considered. With n=7, the example code 420 executes $(3^n+1)/2-2^n=966$ inner loop iterations and stores $2n-1=127$ scalars in each of the arrays $\alpha$, $c_{opt}$, and $\bar{p}_{opt}$.

In one embodiment, the PPU 700 includes 14 SMs 750, and each SM 750 can accommodate 64 warps, has a 256 KB register file 820, and 48 KB of fast shared memory in the shared memory/L1 cache 870. Assuming that one treelet is processed by a warp at full occupancy, 32 scalar registers are available per thread and 768 bytes of shared memory are available per treelet. Placing variables $\alpha$, $c_{opt}$, and $\bar{p}_{opt}$ in shared memory using 4 bytes per element would exceed the available shared memory by a factor of 2. However, because $a[\bar{s}]$ is only needed for calculating $c_{opt}[\bar{s}]$, $\alpha[\bar{s}]$ and $c_{opt}[\bar{s}]$ can be overlayed into the same array. Therefore, the array elements initially represent $\alpha$ until line 7 or 20 of the example code 420 when the array elements are turned into $c_{opt}$. Additionally, the elements of $\bar{p}_{opt}$ are 7-bit integers, so memory can be saved by storing the 7-bit integers as bytes. By using a single array for $\alpha$ and $c_{opt}$ and storing the elements of $\bar{p}_{opt}$ as bytes, the arrays may be stored in 636 bytes of shared memory which is within the 768 bytes of shared memory that is available.

In addition to the arrays, the bounding volumes, SAH costs, primitive counts, node children, and identities of the nodes are also tracked, summing to a total of 11 values per node that are stored in the register file, so that one thread stores the values of one node. In one embodiment, each thread in a warp may read values for any node in the treelet, but only the thread assigned to a particular node may modify values of the node.

The most computationally intensive part of processing a treelet is finding the optimal partitioning for each subset of the treelet leaf nodes, corresponding to lines 10-23 in the example code 420. Since there are no dependencies between subsets of the same size, one technique to parallelize the optimization would be to repeatedly pick one subset for each thread until all subsets of the given size have been processed. TABLE 1 shows the statistics for each subset size with n=7. The first three columns correspond to the loops on lines 10, 11, and 14 of the example code 420, respectively. Total work indicates the number of inner loop iterations that are executed for the given k in total, and the last column shows the overall distribution of the workload.

TABLE 1

Statistics for each subset size in example code 420 with n = 7

| Size(k) | Subsets($\bar{s}$) | Partitionings($\bar{p}$) | Total Work | % |
|---|---|---|---|---|
| 2 | 21 | 1 | 21 | 2 |
| 3 | 35 | 3 | 105 | 11 |
| 4 | 35 | 7 | 245 | 25 |
| 5 | 21 | 15 | 315 | 33 |
| 6 | 7 | 31 | 217 | 22 |
| 7 | 1 | 63 | 63 | 7 |

As shown in TABLE 1, most of the work is concentrated on sizes 4-6, whereas size 2 is practically free. The number of subsets tends to be very uneven, which means that parallelizing the computation over subsets of the same size alone will necessarily lead to low SIMD utilization. In particular, sizes 6 and 7 have the highest amount of work per subset, but offer only a few subsets to process in parallel.

Even though it is necessary for all subsets of size k−1 to be ready before the subsets of size k can be processed to completion, it is still possible to process some subsets of size k earlier. Thus, the SAID utilization can be improved by allowing the processing of multiple subset sizes to overlap. One approach is to process sizes 2 . . . n−2 in a unified fashion, and treat sizes n−1 and n as special cases.

For sizes 2 . . . n−2, a pre-generated schedule may be used as shown in TABLE 2 for n=7. The schedule consists of a fixed number of processing rounds, and identifies which subset each thread should process in each round, if any. The schedule can be generated for any treelet size and SIMD width using a simple algorithm that considers the rounds in reverse order and greedily includes as many subsets in the current round as possible without violating the dependency rules.

TABLE 2

Pre-generated schedule for n = 7

| Round | Subset sizes processed by 32 threads | Active |
|---|---|---|
| 1 | 2 2 2 2 2 2 2 2 2 2 - - - - - - - - - - - - - - - - - - - - - - | 10 |
| 2 | 3 3 3 3 3 3 3 3 3 2 2 2 2 2 2 2 2 2 2 2 - - - - - - - - - - - - | 20 |
| 3 | 4 4 4 3 3 3 3 3 3 3 3 3 3 3 3 3 3 3 3 3 3 3 3 3 3 3 3 3 3 - - - | 29 |
| 4 | 4 4 4 4 4 4 4 4 4 4 4 4 4 4 4 4 4 4 4 4 4 4 4 4 4 4 4 4 4 4 4 - | 32 |
| 5 | 5 5 5 5 5 5 5 5 5 5 5 5 5 5 5 5 5 5 5 5 5 - - - - - - - - - - - | 21 |

Since there are only a few subsets of size n−1 and n, each subset may be parallelized over multiple threads. For n−1, 4 threads are used per subset, and for n, all 32 threads may be used to process the single subset. Parallelization of the subsets is advantageous when the number of partitionings is high enough that the inner loop completely dominates the processing cost. One approach is to consider only a fraction of the partitionings by each thread, and then use parallel reduction to merge the results at the end. Since $\bar{s}$ has a very specific bit pattern with k≥n−1, enumerating the partitionings considered by each thread is straightforward compared to the general case.

In addition to optimizing the partitioning, the AABB calculation for each value of $\bar{s}$ on lines 2-4 of example code 420 may also be parallelized. The minimum or maximum for the 6 scalar components of up to n individual AABBs is computed in parallel by assigning a group of $2^{n-5}$ consecutive subsets to each thread. These subsets share the same 5 highest bits of $\bar{s}$, so an intermediate AABB is calculated first, considering only the leaf nodes that correspond to the 5 highest bits. To obtain the final AABBs, the result is augmented with each combination of the remaining leaf nodes.

Forming the initial treelet is accomplished by expanding the treelet one node at a time in sequential fashion starting with the root node, maintaining a one-to-one mapping between nodes and threads. Even though only the first 2n−1 threads are employed, the overall process is still relatively efficient. At each step, the treelet leaf node with the largest surface area is selected using parallel reduction, and then the two children of the selected leaf node are assigned to two vacant threads. To avoid having to fetch full AABBs from memory for the selection, the values of A(n) may be maintained in a separate array throughout construction of the initial treelet and also during optimization of the treelet.

Reconstruction of the optimal treelet from $\bar{p}_{opt}$ can be performed in a similar manner as formation of the initial treelet, except that the identities of the original internal nodes are reused for the newly created internal nodes. After the reconstruction, new AABBs are calculated for the internal nodes based on their children, the process is repeated in parallel until the results have propagated to the treelet root. Finally, the nodes of the treelet are stored back to memory, bypassing the L1 cache in order to ensure that the results are visible to all SM 750s. As a minor optimization, the output part of the algorithm may be skipped in case it was not possible to improve the SAH cost, i.e., $c_{opt}[2^n-1] \geq C(\text{root})$.

The main loop of the BVH optimization kernel may be organized according to a parallel bottom-up traversal algorithm. Each thread starts from a given BVH leaf node and then walks up the tree, terminating as soon as the thread encounters a node that has not been visited by any other thread. The goal is to form a treelet for each node encountered during the traversal, if the node's corresponding subtree is large enough to support the particular choice of n. In practice, the processing switches from per-thread processing (traversal) to per-warp processing (optimization) at the end of each traversal step, and the set of valid treelet roots is broadcast to the entire warp.

To determine whether a given subtree is large enough to support a treelet with n leaf nodes, the fact that the intermediate BVH always stores one primitive per leaf may be utilized. Since the number of primitives is tracked for the purposes of Equation 2, the same information may be used to decide whether to accept a given node as a treelet root. However, the choice does not necessarily have to be made based on n—any $\gamma \geq n$ may be used, and only nodes whose respective subtrees contain at least $\gamma$ primitives may be chosen as a treelet root.

A full binary tree with m leaf nodes can contain at most $2m/\gamma-1$ subtrees with $\gamma$ or more leaf nodes, and practical BVHs also tend to exhibit similar behavior. Given that the optimization kernel is virtually always dominated by treelet processing, the execution time may be described as $O(m/\gamma)$ to a sufficient degree of accuracy. This means that $\gamma$ provides a very effective way to trade BVH quality for reduced construction time by concentrating less effort on the bottom-most nodes whose contribution to the SAH cost is low.

In practice, multiple rounds of bottom-up traversal and treelet optimization are executed in order for the SAH cost to converge. However, in practice, the bottom part of the BVH generally tends to converge faster that the top part. This is not surprising considering that modifying the topmost nodes can potentially have a large impact on the entire tree, whereas modifying the bottom-most ones usually only affects small localized parts of the scene.

Based on this observation, it makes sense to vary the value of $\gamma$ between rounds. In one embodiment, doubling the value of $\gamma$ after each round may be very effective in reducing the construction time while having only a minimal impact on BVH quality. Using $\gamma=n=7$ as the initial value and executing 3 rounds in total has proven to be a good practical choice for many test scenes.

Figure 9:
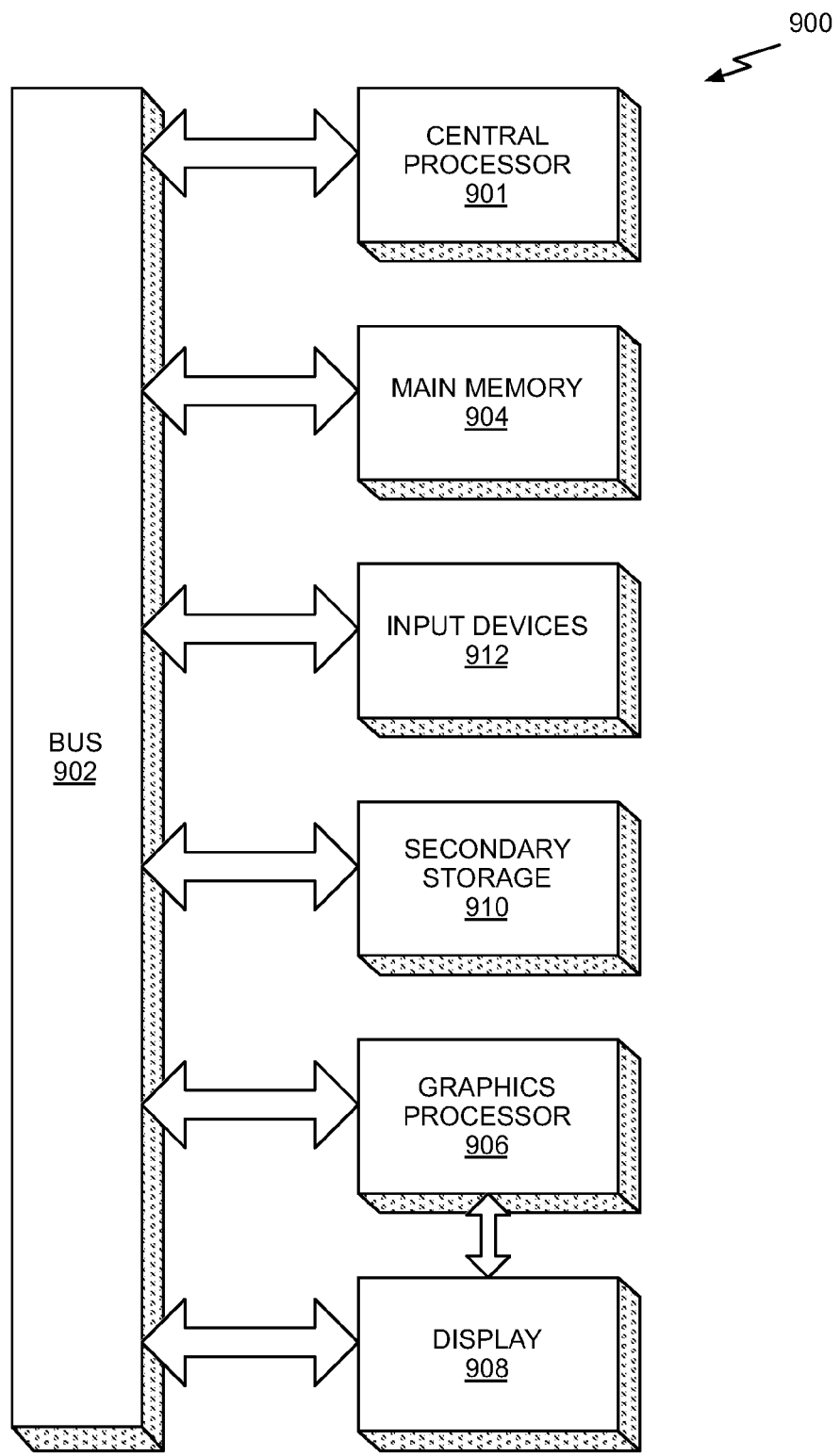
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. For example, a compiler program that is configured to examiner a shader program and enable or disable attribute buffer combining may be stored in the main memory 904. The compiler program may be executed by the central processor 901 or the graphics processor 906. The main memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a parallel processing unit that is configured to execute threads in a group of threads in parallel, an initial hierarchical tree data structure;
   forming treelets of node neighborhoods; and
   restructuring, by the parallel processing unit executing the threads in parallel, a first treelet of the treelets to produce a restructured hierarchical tree data structure including at least one restructured treelet, wherein the restructuring comprises:
      merging a portion of treelet nodes within the first treelet to produce internal treelet nodes;
      computing a first surface area cost of the internal treelet nodes; and
      before merging remaining treelet nodes within the first treelet, estimating a second surface area cost of additional internal treelet nodes to be produced by merging the remaining treelet nodes.

2. The method of claim 1, wherein the restructuring further comprises:
   initializing a set of nodes yet to be merged within the portion of treelet nodes to include n treelet leaf nodes;
   merging, in parallel, two or more pairs of the nodes in the set to generate at least a portion of the internal treelet nodes; and
   removing the two or more pairs of the nodes from the set.

3. The method of claim 2, wherein the restructuring further comprises:
   before the merging, adding at least one of the portion of the internal treelet nodes to the set of nodes; and
   repeating the merging, removing, and adding until less than a pre-determined number of nodes remain in the set of nodes yet to be merged.

4. The method of claim 1, wherein the restructuring further comprises:
   constructing a restructured treelet corresponding to a second treelet of the treelets; and
   replacing the second treelet with the restructured treelet if a cost function indicates that the restructured treelet improves the hierarchical tree data structure.

5. The method of claim 1, wherein the restructuring further comprises reusing treelet leaf nodes of the first treelet to produce a restructured treelet having a different depth-first order of the treelet leaf nodes than the first treelet.

6. The method of claim 1, wherein the initial hierarchical tree data structure is a bounding volume hierarchy tree data structure.

7. The method of claim 1, wherein the restructuring of the first treelet is performed in parallel by allocating one of the threads to each treelet node in the portion of treelet nodes.

8. The method of claim 1, further comprising constructing the initial hierarchical tree data structure using a construction technique that produces an initial hierarchical tree data structure having three or more nodes.

9. The method of claim 1, further comprising:
   restructuring the at least one restructured treelet to produce at least one additional restructured treelet; and
   for each treelet root, selecting either a restructured treelet from the at least one restructured treelet or a corresponding restructured treelet from the at least one additional restructured treelet.

10. The method of claim 1, further comprising:
    restructuring a second treelet of the treelets using agglomerative clustering to produce a second restructured treelet;
    using a combination of the first treelet and the second treelet.

11. The method of claim 1, further comprising:
    using the hierarchical tree data structure to perform intersection tests;
    forming second treelets of node neighborhoods; and
    restructuring the second treelets.

12. A system comprising:
    a memory storing a initial hierarchical tree data structure; and
    a parallel processing unit that is coupled to the memory and executes threads in a group of threads in parallel and is configured to:
       receive the initial hierarchical tree data structure;
       form treelets of node neighborhoods; and
       restructure a first treelet of the treelets to produce a restructured hierarchical tree data structure by executing the threads in parallel, wherein the restructuring comprises:
          merging a portion of treelet nodes within the first treelet to produce internal treelet nodes;
          computing a first surface area cost of the internal treelet nodes; and
          before merging remaining treelet nodes within the first treelet, estimating a second surface area cost of additional internal treelet nodes to be produced by merging the remaining treelet nodes.

13. The system of claim 12, wherein the restructuring of the first treelet is performed in parallel by allocating one of the threads to each treelet node in the portion of treelet nodes.

14. A non-transitory computer-readable storage medium storing instructions that, when executed by a parallel processing unit, cause the parallel processing unit to modify a hierarchical tree data structure, comprising:
    receiving, by a parallel processing unit that is configured to execute threads in a group of threads in parallel, an initial hierarchical tree data structure;
    forming treelets of node neighborhoods; and restructuring a first treelet of the treelets to produce a restructured hierarchical tree data structure by executing the threads in parallel, wherein the restructuring comprises:

merging a portion of treelet nodes within the first treelet to produce internal treelet nodes;

computing a first surface area cost of the internal treelet nodes; and before merging remaining treelet nodes within the first treelet, estimating a second surface area cost of additional internal treelet nodes to be produced by merging the remaining treelet nodes.

* * * * *